(12) United States Patent
Mistyurik et al.

(10) Patent No.: US 10,494,131 B2
(45) Date of Patent: Dec. 3, 2019

(54) COMBINATION PRINTER AND CUTTING APPARATUS

(71) Applicant: AVERY DENNISON RETAIL INFORMATION SERVICES, LLC, Mentor, OH (US)

(72) Inventors: John D. Mistyurik, Troy, OH (US); Timothy L. Brown, Dayton, OH (US); Donald J. Ward, Sayre, PA (US); Jan M. Watson, Miamisburg, OH (US); Jesus Romo, Jr., Fairborn, OH (US); Jason R. Wheeler, Sayre, PA (US); Mitchell G. Stern, Centerville, OH (US); Jeanne F. Duckett, Franklin, OH (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 15/968,511

(22) Filed: May 1, 2018

(65) Prior Publication Data

US 2018/0311979 A1 Nov. 1, 2018

Related U.S. Application Data

(60) Provisional application No. 62/492,500, filed on May 1, 2017, provisional application No. 62/552,240, filed
(Continued)

(51) Int. Cl.
*B26D 1/18* (2006.01)
*B26D 1/20* (2006.01)
(Continued)

(52) U.S. Cl.
CPC ............ *B65C 9/1803* (2013.01); *B26D 1/185* (2013.01); *B26D 1/205* (2013.01); *B26D 3/085* (2013.01);
(Continued)

(58) Field of Classification Search
CPC ........ B26D 1/185; B26D 1/205; B26D 3/085; B26D 2007/005; B26D 1/18; B26D 1/20;
(Continued)

(56) References Cited

U.S. PATENT DOCUMENTS 3,099,212 A 7/1963 Sohn
3,749,626 A 7/1973 Buck
(Continued)

FOREIGN PATENT DOCUMENTS

CN 101829831 8/2011
CN 104070841 1/2017
(Continued)

OTHER PUBLICATIONS

International Search Report and Written Opinion of ISA/EPO dated Mar. 13, 2017 prepared for PCT/US2016/065386.
(Continued)

*Primary Examiner* — Huan H Tran
*Assistant Examiner* — Alexander D Shenderov
(74) *Attorney, Agent, or Firm* — Avery Dennison Retail Information Services, LLC

(57) ABSTRACT

A combination printer and cutting device for printing upon and cutting a web of media or tag stock into individual units. The device may cut vinyl, plastic, or RFID stock material as it moves through the printer in both back and forth directions. The device comprises a printer and a cutting apparatus that is further comprised of a carriage assembly and a movable cutter assembly. The cutter assembly is easily interchangeable and comprises a cutting element such as a
(Continued)

wheel blade, and a pressure adjusting element for adjusting the amount of pressure applied by the cutting element to the stock material. Alternatively, the cutter assembly may be manufactured with a predetermined pressure load, but still permit an operator to adjust the depth of cut. The cutting apparatus is adaptable for use with both new and existing printers.

19 Claims, 32 Drawing Sheets

Related U.S. Application Data on Aug. 30, 2017, provisional application No. 62/552,248, filed on Aug. 30, 2017, provisional application No. 62/552,252, filed on Aug. 30, 2017.

(51) Int. Cl.
| | | |
|---|---|---|
| *B26D 3/08* | (2006.01) | |
| *B26D 5/00* | (2006.01) | |
| *B26D 5/08* | (2006.01) | |
| *B26D 7/00* | (2006.01) | |
| *B26D 7/26* | (2006.01) | |
| *B31D 1/02* | (2006.01) | |
| *B65C 9/18* | (2006.01) | |
| *B41J 11/66* | (2006.01) | |

(52) U.S. Cl.
CPC ............. *B26D 5/08* (2013.01); *B26D 7/2635* (2013.01); *B31D 1/021* (2013.01); *B31D 1/026* (2013.01); *B41J 11/66* (2013.01); *B26D 5/007* (2013.01); *B26D 7/2621* (2013.01); *B26D 2007/005* (2013.01); *B65C 2009/1834* (2013.01)

(58) Field of Classification Search
CPC .......... B26D 3/08; B26D 7/2621; B26D 5/08; B26D 5/007; B26D 7/2635; B41J 11/66; B65C 2009/1834; B31D 1/021; B31D 1/026
USPC ........................................................ 347/104
See application file for complete search history.

(56) References Cited

U.S. PATENT DOCUMENTS

| | | | |
|---|---|---|---|
| 3,955,502 A | 5/1976 | Von Hofe | |
| 4,035,808 A | 7/1977 | Karp | |
| 4,042,939 A | 8/1977 | Lloyd | |
| 4,111,121 A | 9/1978 | Borum | |
| 4,246,058 A | 1/1981 | Reed | |
| 4,405,401 A | 9/1983 | Stahl | |
| 4,449,433 A | 5/1984 | Miyamoto | |
| 4,504,162 A | 3/1985 | Speraggi | |
| 4,525,088 A | 6/1985 | Shipos et al. | |
| 4,624,164 A | 11/1986 | Passa | |
| 4,905,558 A | 3/1990 | Corcoran | |
| 4,936,177 A | 6/1990 | Ozawa et al. | |
| 4,979,838 A | 12/1990 | Yokota et al. | |
| 4,981,059 A | 1/1991 | Kobayashi | |
| 5,000,812 A | 3/1991 | Murphy | |
| 5,001,955 A | 3/1991 | Fujiwara | |
| 5,017,257 A | 5/1991 | Murphy | |
| 5,235,887 A | 8/1993 | Moriya | |
| 5,286,317 A | 2/1994 | Treat et al. | |
| 5,388,490 A | 2/1995 | Buck | |
| 5,431,077 A | 7/1995 | Murakami | |
| 5,480,081 A | 1/1996 | Wilson et al. | |
| 5,520,760 A | 5/1996 | Freedman | |
| 5,524,996 A | 6/1996 | Carpenter et al. | |
| 5,584,218 A | 12/1996 | Schoendienst | |
| 5,613,788 A | 3/1997 | Dobring | |
| 5,690,012 A | 11/1997 | Blandin et al. | |
| 5,784,077 A | 7/1998 | Silverbrook | |
| 5,813,305 A | 9/1998 | Miazga et al. | |
| 5,833,380 A | 11/1998 | Hosomi et al. | |
| 5,881,623 A | 3/1999 | Otani | |
| 5,937,723 A | 8/1999 | Kirikoshi et al. | |
| 5,937,725 A * | 8/1999 | Kamijo ................. | B26D 3/085 83/56 |
| 6,014,921 A | 1/2000 | Angel et al. | |
| 6,102,596 A | 8/2000 | Komori et al. | |
| 6,109,154 A | 8/2000 | Keiji | |
| 6,118,469 A | 9/2000 | Hosomi | |
| 6,152,007 A | 11/2000 | Sato | |
| 6,155,731 A | 12/2000 | Bertalan | |
| 6,177,163 B1 | 1/2001 | Blok et al. | |
| 6,212,984 B1 | 4/2001 | Kane | |
| 6,286,403 B1 * | 9/2001 | Rosenthal ............. | B26D 1/205 83/152 |
| 6,302,605 B1 * | 10/2001 | Kanbe ..................... | B26D 3/12 400/621 |
| 6,339,982 B1 | 1/2002 | Angel et al. | |
| 6,491,460 B1 | 12/2002 | Sodeyama | |
| 6,499,403 B1 | 12/2002 | Laulanet | |
| 6,550,908 B1 | 4/2003 | Heitz | |
| 6,599,044 B2 | 7/2003 | Paris | |
| 6,616,360 B2 | 9/2003 | Lehmkuhl | |
| 6,641,684 B2 | 11/2003 | Instance | |
| 6,664,995 B2 | 12/2003 | Milton et al. | |
| 6,742,858 B2 | 6/2004 | Lehmkuhl et al. | |
| 6,749,352 B2 | 6/2004 | Yamada | |
| 6,782,784 B2 | 8/2004 | Sato et al. | |
| 6,786,125 B2 | 9/2004 | Imai | |
| 6,832,537 B2 | 12/2004 | Takabatake et al. | |
| 7,815,382 B2 | 10/2010 | Monclus et al. | |
| 8,047,250 B2 | 11/2011 | Kolp et al. | |
| 8,167,017 B2 | 5/2012 | Kolp et al. | |
| 8,507,064 B2 | 8/2013 | McCarthy et al. | |
| 8,529,145 B2 | 9/2013 | Cordero et al. | |
| 8,562,229 B2 | 10/2013 | Inaba | |
| 8,596,894 B2 | 12/2013 | Hanaoka | |
| 8,613,562 B2 | 12/2013 | Shirotori et al. | |
| 8,651,003 B1 | 2/2014 | Vercellone | |
| 8,663,410 B2 | 3/2014 | Cummin et al. | |
| 8,960,064 B2 | 2/2015 | Supron et al. | |
| 9,004,790 B2 | 4/2015 | Kishi et al. | |
| 9,167,017 B2 | 10/2015 | Basso et al. | |
| 9,199,388 B2 | 12/2015 | Cummins et al. | |
| 9,321,286 B2 | 4/2016 | Bar-Tal et al. | |
| 9,333,665 B2 | 5/2016 | Niizeki | |
| 9,415,612 B2 | 8/2016 | Roctus et al. | |
| 9,545,733 B2 | 1/2017 | Maruyama et al. | |
| 9,834,007 B2 | 12/2017 | Sone et al. | |
| 9,849,601 B2 | 12/2017 | Anayama et al. | |
| 9,956,794 B2 | 5/2018 | Mitsuo | |
| 2003/0144853 A1 | 7/2003 | Stehouwer et al. | |
| 2003/0156683 A1 | 8/2003 | Adachi | |
| 2003/0156883 A1 | 8/2003 | Kobayashi et al. | |
| 2004/0028505 A1 | 2/2004 | Bilbrey | |
| 2004/0177738 A1 | 9/2004 | Mori et al. | |
| 2005/0000842 A1 | 1/2005 | Timmerman et al. | |
| 2005/0123336 A1 | 6/2005 | Oshida et al. | |
| 2006/0162524 A1 | 7/2006 | Suzuki et al. | |
| 2007/0095179 A1 | 5/2007 | McCarty et al. | |
| 2008/0060535 A1 | 3/2008 | Edwards et al. | |
| 2008/0181711 A1 | 7/2008 | Monclus | |
| 2008/0223512 A1 | 9/2008 | Sievel | |
| 2008/0236354 A1 | 10/2008 | Esposito | |
| 2010/0109316 A1 | 5/2010 | Hong et al. | |
| 2011/0155324 A1 | 6/2011 | Tai | |
| 2011/0170931 A1 | 7/2011 | Kawaguchi | |
| 2011/0280644 A1 | 11/2011 | Toyoshima | |
| 2011/0290093 A1 | 12/2011 | Kikuchi | |
| 2013/0239768 A1 * | 9/2013 | Supron ................. | B26D 1/015 83/508 |
| 2014/0130987 A1 | 5/2014 | Li et al. | |
| 2014/0210896 A1 | 7/2014 | Bar-Tal et al. | |
| 2015/0053104 A1 | 2/2015 | Schuh et al. | |
| 2016/0067987 A1 | 3/2016 | Ohashi et al. | |

(56) References Cited

U.S. PATENT DOCUMENTS

2016/0303892 A1   10/2016  Killian et al.
2017/0087889 A1    3/2017  Kikuchi et al.
2017/0087890 A1    3/2017  Masuda et al.
2017/0200073 A9    7/2017  Duckett et al.

FOREIGN PATENT DOCUMENTS

| | | |
|---|---|---|
| DE | 2516476 | 10/1976 |
| DE | 19958274 | 6/2001 |
| EP | 0359576 | 3/1990 |
| EP | 0737552 | 10/1996 |
| EP | 0761584 | 3/1997 |
| EP | 0807525 | 11/1997 |
| EP | 1193035 | 4/2002 |
| EP | 2106887 | 10/2009 |
| EP | 2529938 | 12/2012 |
| GB | 935325 | 8/1963 |
| JP | 2001001292 | 1/2001 |

OTHER PUBLICATIONS

International Preliminary Report on Patentability of ISA/EPO dated Jun. 12, 2018 prepared for PCT/US2016/065386.
International Search Report and Written Opinion of ISA/EPO dated Oct. 29, 2018 prepared for PCT/US2018/030511.
International Search Report and Written Opinion of ISA/EPO prepared for PCT/US2018/030519 dated Sep. 28, 2018.
International Search Report and Written Opinion of ISA/EPO prepared for PCT/US2018/030505 dated Sep. 26, 2018.

* cited by examiner

COMBINATION PRINTER AND CUTTING APPARATUS

CROSS REFERENCE TO RELATED APPLICATION(S)

The present application claims priority to and the benefit of U.S. Provisional Application No. 62/492,500 filed on May 1, 2017, U.S. Provisional Application No. 62/552,240 filed on Aug. 30, 2017, U.S. Provisional Application No. 62/552,248 filed on Aug. 30, 2017, and U.S. Provisional Application No. 62/552,252 filed on Aug. 30, 2017, each of which is incorporated herein by reference in its entirety.

BACKGROUND

The present invention relates generally to a combination printer and cutting apparatus for printing upon and then cutting media to create on demand "kiss cut" or "die cut" like labels. Traditional methods of creating a pressure sensitive label matrix primarily involved either a die cutting or an etching or stenciling process with a blade or a laser. For example, die cutting is typically performed with either a flatbed or rotary mechanism, and involves the process of using a die to shear webs of low-strength material, such as pressure-sensitive label material. Historically, die cutting began as a process of cutting leather for the shoe industry in the mid-19th century, but evolved over time and is now sophisticated enough to cut through a single layer of a laminate, thereby making the process applicable to the production of labels, stamps, stickers, etc. When only the top layer of a laminate is to be cut, the die cutting operation is typically performed in a straight line and is known as "kiss cutting" because the cutting process does not disturb or cut through the laminate or label backing.

Unfortunately, there are a number of limitations associated with producing labels, such as pressure sensitive labels, via die cutting. For example, dies can be expensive to manufacture and maintain and require that the operator stock dies of various shapes, sizes and configurations to satisfy customer demand. For example, if a customer requires a label having a unique shape, size or configuration, the die operator may have to manufacture or purchase a special die to be able to produce the labels to satisfy that particular customer, which can be both time consuming and expensive.

Further, printers used to create tags or labels typically employ a supply of tag stock that needs to be cut into individual units once printing is complete. A single roll of tag or supply stock can be sectioned into a large number of individual tags. Therefore, if in the middle of a production run with a particular die, a different size or shape of label is desired, production must be interrupted so that the die can be replaced with the desired die, which results in downtime and unwanted expense.

Printers with integrated cutting devices give users the ability to print and cut in a single operation with one device, thereby requiring less floor or desk space and/or footprint. Printers used to create tags or labels may employ a supply of tag stock that needs to be cut into individual units once printing is complete. A single roll of tag stock can be sectioned into a large number of individual tags. The tag stock used for many of these labels is constructed from plastic, vinyl, or RFID supply material that is more difficult to cut than paper.

Also, other existing cutters used with printers to cut these types of materials suffer from other deficiencies or limitations. For example, circuit cutters are designed for cutting paper and cannot effectively cut plastic or other heavy duty stock. Stencil cutters designed for cutting vinyl stencils are similar to a single pen plotter, but with a stencil cutter holder, and an adjustable blade. Blades may have different cutter angles. However, testing with printer stock has shown that steeper profiles, such as an approximately 60 degree angle, catch the edge of the stock and jam the carriage of the printer or cutting device. Medium profiles, such as an approximately 45 degree angle, move over the edge of the stock, but bounce causing a perfect for a short distance, which is undesirable. Lower profiles, such as an approximately 25 degree angle, move over the edge of the stock, but the leading edge is not perfect which is most likely caused by cutter bounce from riding over the leading edge of the stock. Additionally, edge damage tends to be an issue as this type of cutter moves into the stock if it is not positioned flat on the anvil.

While flatter blade angles generally ride more easily over the leading edge, any damage to the edge of the supply roll may still lead to jamming of the printer or cutting device. Additionally, these types of cutter tends to wear quickly, which results in imperfect cuts to the stock over time and frequent downtime while the cutter is being repaired (e.g., sharpened) or replaced. Adhesive can also build up on the cutter blade, thereby exacerbating the problem. And, if the media being cut is not held under some tension, jamming of the printer or other cutting device may occur. Blades with flatter cutting angles and the anvils that they cut against are also prone to early wear and failure. There are also limitations on the speed that the cutter can travel without bouncing. Furthermore, it is unclear whether rotating this type of cutter 180° to turn and make a return cut will have an adverse impact on the overall life of the cutter, printer or other device.

Consequently, there exists a long felt need in the art for a combination printer/cutter device that can cut heavy or plastic tag stock cleanly and efficiently without jamming. There also exists a need for a combination printer/cutter device that can create a cutting operation to simulate die cutting by cutting only the top layer or sheet of a laminate to enable a user to order and stock one base roll and generate, on demand, multiple labels of varying shapes, sizes and configurations therefrom.

The present invention discloses a unique combination printer/cutting apparatus capable of printing upon and then cutting tag stock or base roll material made from plastic, vinyl, or RFID supply material, in addition to normal and/or light weight tag or paper stock materials. The present invention also discloses a unique combination printer/cutting apparatus capable of performing "kiss cuts" and other cuts resembling die cuts, without the disadvantages typically associated with the use of die cutters. In addition, the present invention discloses unique user features to configure and maintain the combination printer/cutting apparatus and its various components in a safe and efficient manner.

The cutting apparatus of the present invention may be incorporated into a new or used printer, such as those printers presently manufactured and sold by Avery Dennison Corporation of Pasadena, Calif. including the ADTP1 and ADTP2 tag cutting printers, or as an accessory to said printers or as a mobile device so that it can be moved to various different locations to work with an industrial printer or other combination.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a combination printer/cutting device to print upon and then cut or "kiss cut" media. The combination device is preferably comprised of a printer and a cutter apparatus that is, in turn, preferably comprised of a cutter assembly, a carriage assembly, a drive element and a motor for powering the drive element and/or the printer. The carriage assembly is mountable within the printer and movably retains the cutter assembly.

In accordance with one embodiment, the cutter assembly, carriage assembly, drive element and motor are positioned at least partially within the printer housing. The printer housing may also comprise one or more electrical connections and/or data connections so that the cutter apparatus can take commands (via hardline or wireless) from the computer that is driving the printer, or the printer itself. The cutting apparatus may further comprise an entry port for receiving the printed on material from the printer, and an exit port for discharging the cut stock media. In a further preferred embodiment of the present invention, the printer housing may also comprise a basket, positioned adjacent to and slightly beneath the exit port to catch and store the cut stock media until the operator is ready to retrieve the same.

In one embodiment, the carriage assembly comprises a base element, a guide shaft, and a screw shaft, and the base element comprises a strike plate or anvil. The screw shaft moves the cutter assembly back and forth along the guide shaft, and across the media or stock being cut (i.e., cuts in both a forward and a backward direction). The cutter assembly further comprises a pressure adjusting element for adjusting the amount of force or pressure that the cutting element applies to the media or stock being cut. The cutting element may comprise a first bevel and a second bevel to better facilitate cutting in both back and forth directions as the cutter assembly moves back and forth across the stock media, and is also capable of making angled cuts and perpendicular cuts across the web.

In an alternative embodiment, the carriage assembly comprises a base element, a guide shaft, and a screw shaft, and the base element comprises a strike plate or anvil. The screw shaft moves the cutter assembly back and forth along the guide shaft, and across the media or stock being cut (i.e., cuts in both a forward and a backward direction). The cutter assembly further comprises a cutter carriage and an easily interchangeable cutter cartridge, wherein said cutter cartridge comprises a cut depth adjustment knob, a detent component, an eccentric pinion shaft, a bearer roller and a cutting element. The cutting element may comprise a first bevel and a second bevel to better facilitate cutting in both back and forth directions as the cutter assembly moves back and forth across the stock media, and is also capable of making angled cuts and perpendicular cuts across the web.

In one embodiment, the cutting force of the cutter assembly is not adjustable, but is of a fixed load as assembled, based on the amount of force to cut through the most severe or hardiest of allowable media. The cut depth is controlled by the diametric difference of an adjacent bearer roller to the cutter wheel, and can be further adjusted by the operator for additional control by means of a rotatable eccentric pinion shaft shared by both a bearer roller and the cutter wheel.

In one embodiment of the present invention, the cutter mechanism and attaching covers may be configured to have a wide angled exit throat to facilitate the delamination and removal of newly cut labels or other materials from the liner carrier web. Additionally, the worm screw shaft may be positioned closer to the cutter wheel to oppose cutter forces and minimize long term wear. Further, the cutter carrier may be comprised of a Teflon-filled copolymer or similar material to reduce friction and wear on the device. In another embodiment, the cutting apparatus is configured to conform with a ribbon path of the printer to allow as close proximity to the printer's print head as possible.

In another embodiment, the cutter wheel and depth controlling components are housed within a cartridge assembly that is easily installed and removed from the cutter carrier without the use of external tools, thereby decreasing overall downtime for the cutting apparatus and resulting in cost savings for the operator. Further, said components may be retained in position by the same component that applies the cutting pressure to the cutter wheel.

In one embodiment, additional cut depth may be controlled by rotating the common eccentric shaft that supports the cutter wheel and the bearer roller up to 90° in either a clockwise or counter-clockwise direction. More specifically, the eccentric shaft is held in an indexed position by means of a detent component that is actuated by the same component that applies cutting pressure to the cutter cartridge and cutter wheel.

In one embodiment of the present invention, cutting pressure may be attained by use of a single extension spring which rotates a pressure hub component about the worm screw shaft to result in direct line force downward onto the cutter cartridge and ultimately the cutter wheel. In another embodiment, the cutting anvil or plate, which is expected to be a wear item, may be screwed onto a mounting surface and configured symmetrically so as to be able to be reoriented 180° and/or flipped over. In this manner, the cutting anvil or plate could have up to four separate useful lives before having to be replaced, thereby resulting in cost savings to the operator and less overall downtime for the cutting apparatus.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
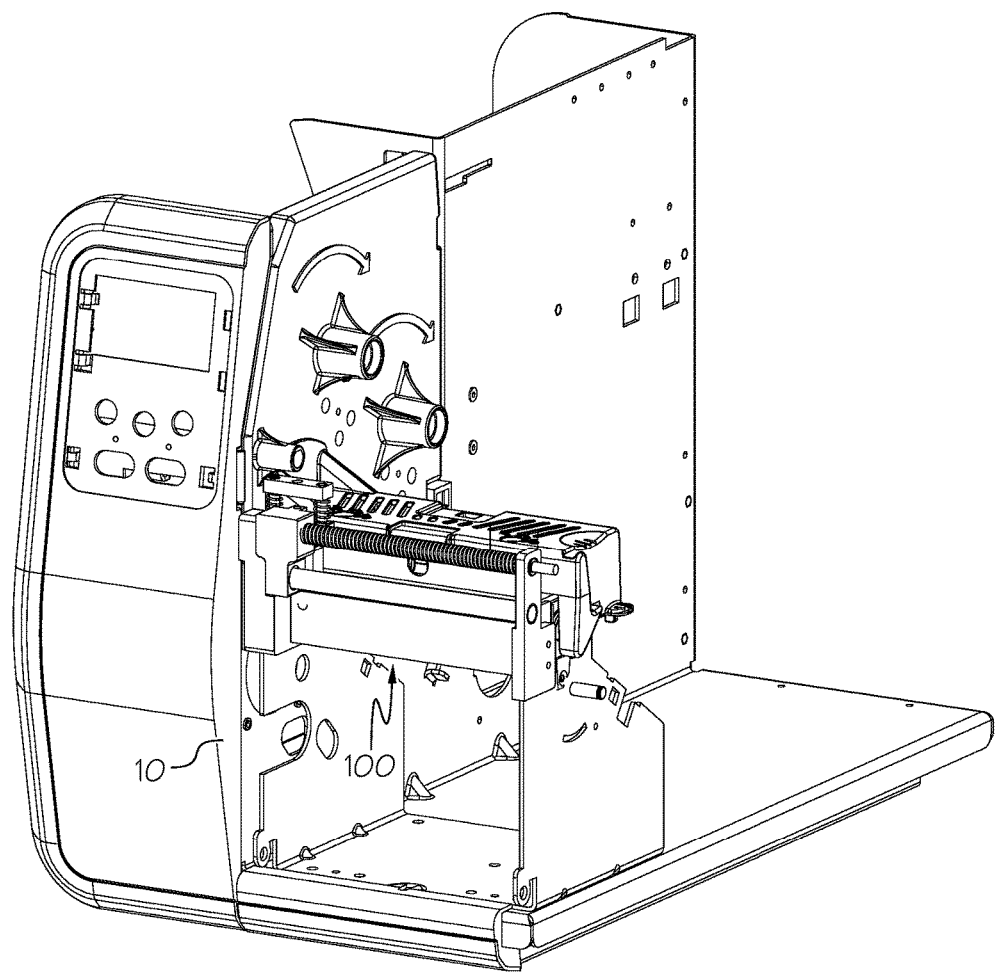
FIG. 1 illustrates a cutaway perspective view of one embodiment of the cutting apparatus of the present invention mounted to a printer in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a combination printer/cutting apparatus that can print upon and then quickly and cleanly cut or "kiss cut" a web of media stock 20, such as the face sheet of a paper laminate, vinyl or RFID stock material, in both a back and forth direction, or traverse to the direction of the web, without damaging the cutting blade or stock material, or jamming the printer. The present invention is not limited to a back and forth cutting motion, parallel to the plane of the web, and contemplates other cutting motions as well such as vertical to the plane of the web. Specifically, the cutting apparatus of the present invention can make "die cut" like cuts on stock 20 without suffering from the same structural and operational limitations of traditional die cutting devices.

Figure 2:
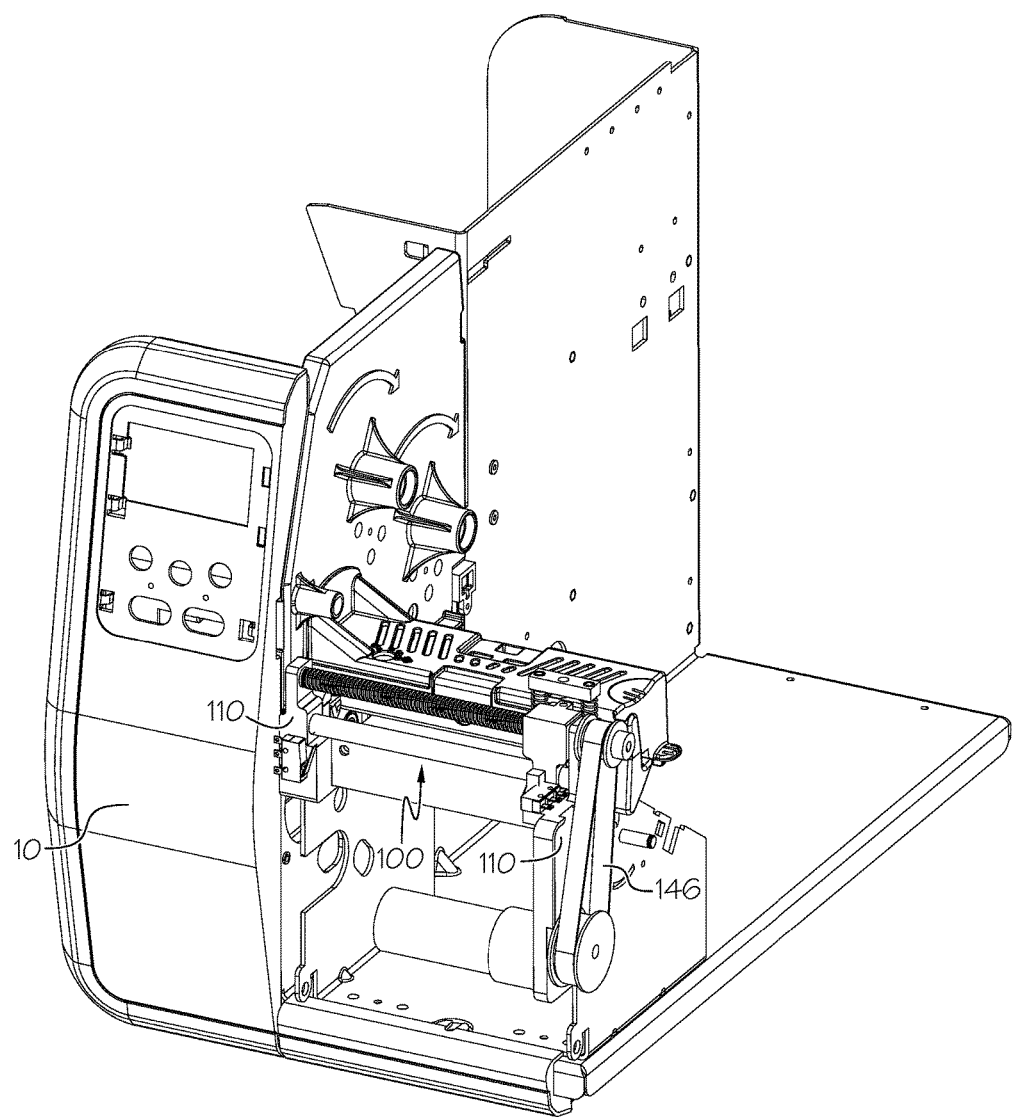
FIG. 2 illustrates a cutaway perspective view of one embodiment of the cutting apparatus of the present invention mounted to the printer and in communication with a drive assembly, all in accordance with the disclosed architecture.
Figure 3:
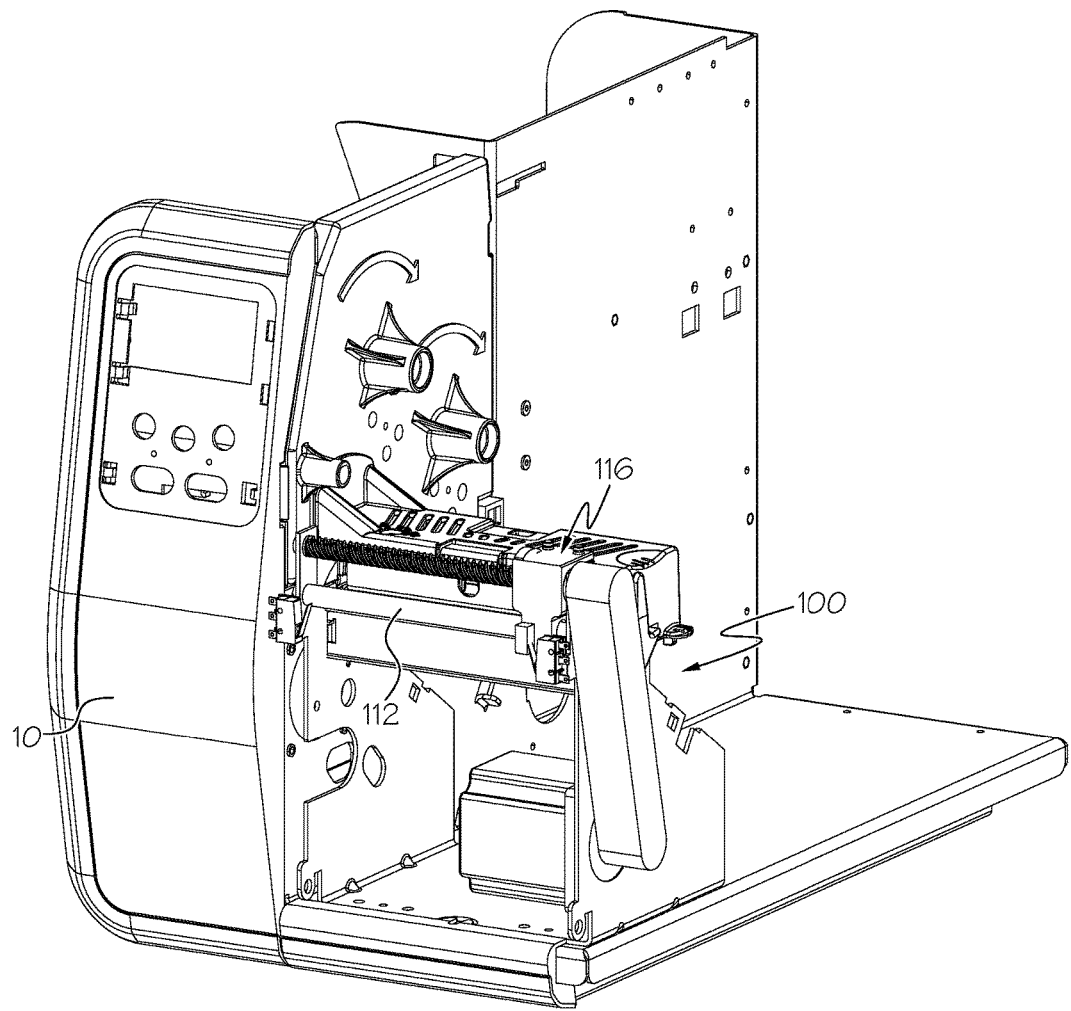
FIG. 3 illustrates a cutaway perspective view of one embodiment of the cutting apparatus of the present invention mounted to the printer and in communication with an alternative drive assembly, all in accordance with the disclosed architecture.

Referring initially to the drawings, FIGS. 1-3 illustrate a combination printer/cutting device comprised of a printer 10 and a cutting apparatus 100 in accordance with the present invention. The device is used to print upon and then cut a supply stock such as, but not limited to, paper, cardboard, laminated materials, plastic, vinyl, RFID supply, and the like, or any other material known to one of ordinary skill in the art. The supply stock may be a heavy-weight, normal or light-weight stock material known in the art.

Printer 10 may be any type of printer known in the art for printing on a supply stock including, without limitation, table top, portable, and other types of ink jet, thermal, laser printers, such as those currently manufactured and sold by Avery Dennison® Corporation of Pasadena, Calif. including the ADTP1 and ADTP2 tag cutting printers. While it is contemplated that printer 10 and cutting apparatus will be integrally housed in the same device, cutting apparatus 100 may also be an accessory to printer 10 and can be positioned downstream of printer 10 to cut printed on supply stock 20 supplied by the printer, or used in wireless communication with said printer. In one embodiment presently contemplated, the cutting apparatus 100 may be placed upstream, prior to printing.

Cutting apparatus 100 is mountable on both new and user printers 10, as needed. To mount on an existing or used printer 10, the cutting apparatus 100 may be mounted using the existing holes used to mount a stripper bracket (not shown). Alternatively, the cutting apparatus 100 may also be adaptable as an accessory for connection to an outlet port (not shown) of an existing table top, portable, or other type of ink jet, thermal, laser printer, or used in wireless communication with said printer 10.

Figure 4:
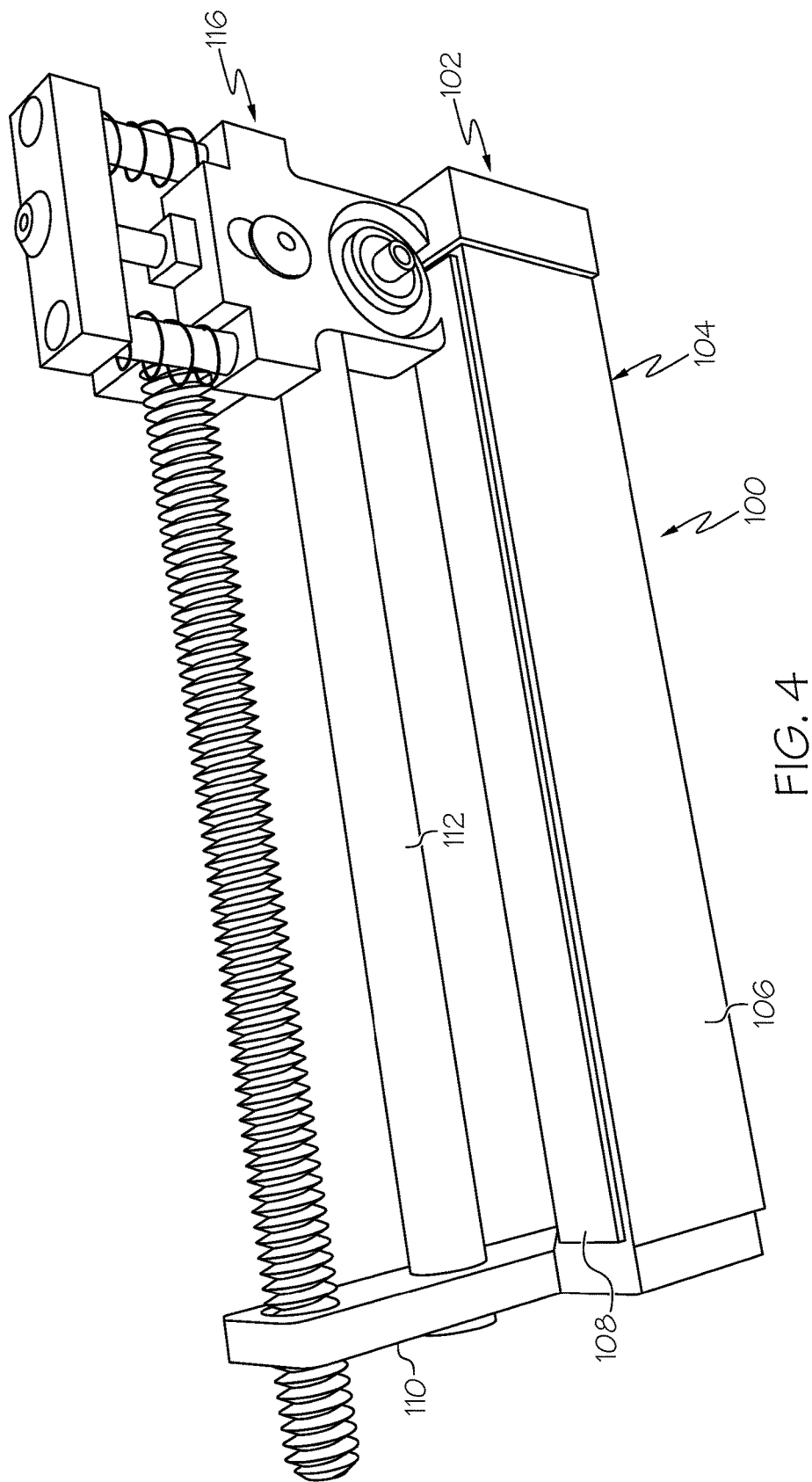
FIG. 4 illustrates a perspective view of one embodiment of the cutting apparatus not mounted to a printer in accordance with the disclosed architecture.

Cutting apparatus 100 is preferably comprised of a carriage assembly 102 and a repositionable cutter assembly 116 having a cutting element 134 that is permitted to travel along a shaft, such as a screw shaft 114, as explained more fully below. As best illustrated in FIG. 4, the carriage assembly 102 may comprise a base element 104 and a pair of side brackets 110 extending upwardly therefrom. Each of the pair of side brackets 110 is attachable to the printer, typically in the same screw holes as the slot usually occupied by an existing stripper (not shown). More specifically, each of the pair of side brackets 110 is attachable to printer 10 by any means commonly known in the art such as fasteners, tabs, etc. Once attached, the cutting apparatus 100 is located substantially adjacent to the printer's print head assembly (not shown). The supply stock 20 accepts printing and then moves through the cutting apparatus 100 for sectioning into individual labels or tags. Furthermore, the cutting apparatus 100 is easily removable so that the printer 10 can be reconverted back to a stand-alone printer as needed.

The combination printer and cutting device may further comprise a basket or tray (not shown) positioned adjacent to and below the exit port of cutting apparatus 100 to receive the printed on and/or cut supply stock 20 as it is discharged from cutting apparatus 100, and store the same for the user (not shown).

Figure 9:
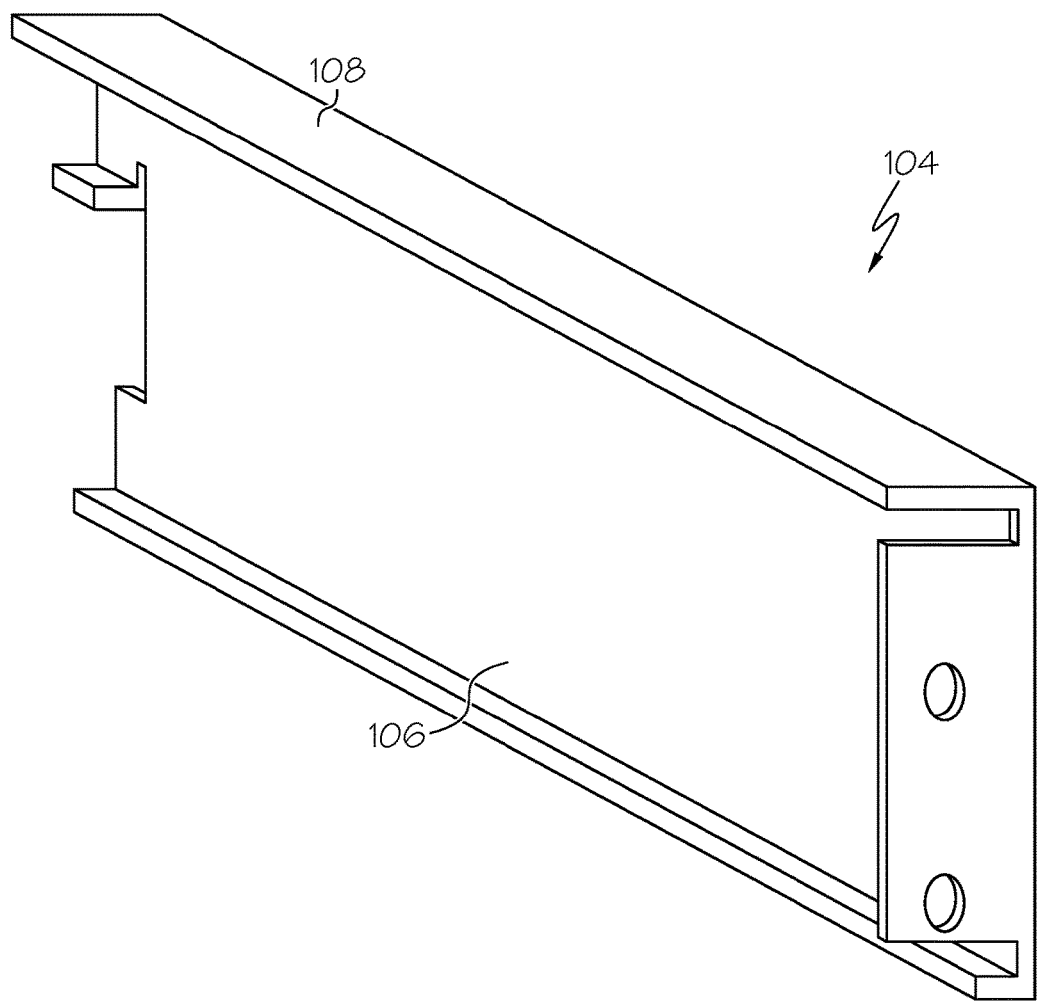
FIG. 9 illustrates a perspective view of a base element of a carriage assembly of the cutting apparatus in accordance with the disclosed architecture.
Figure 10:
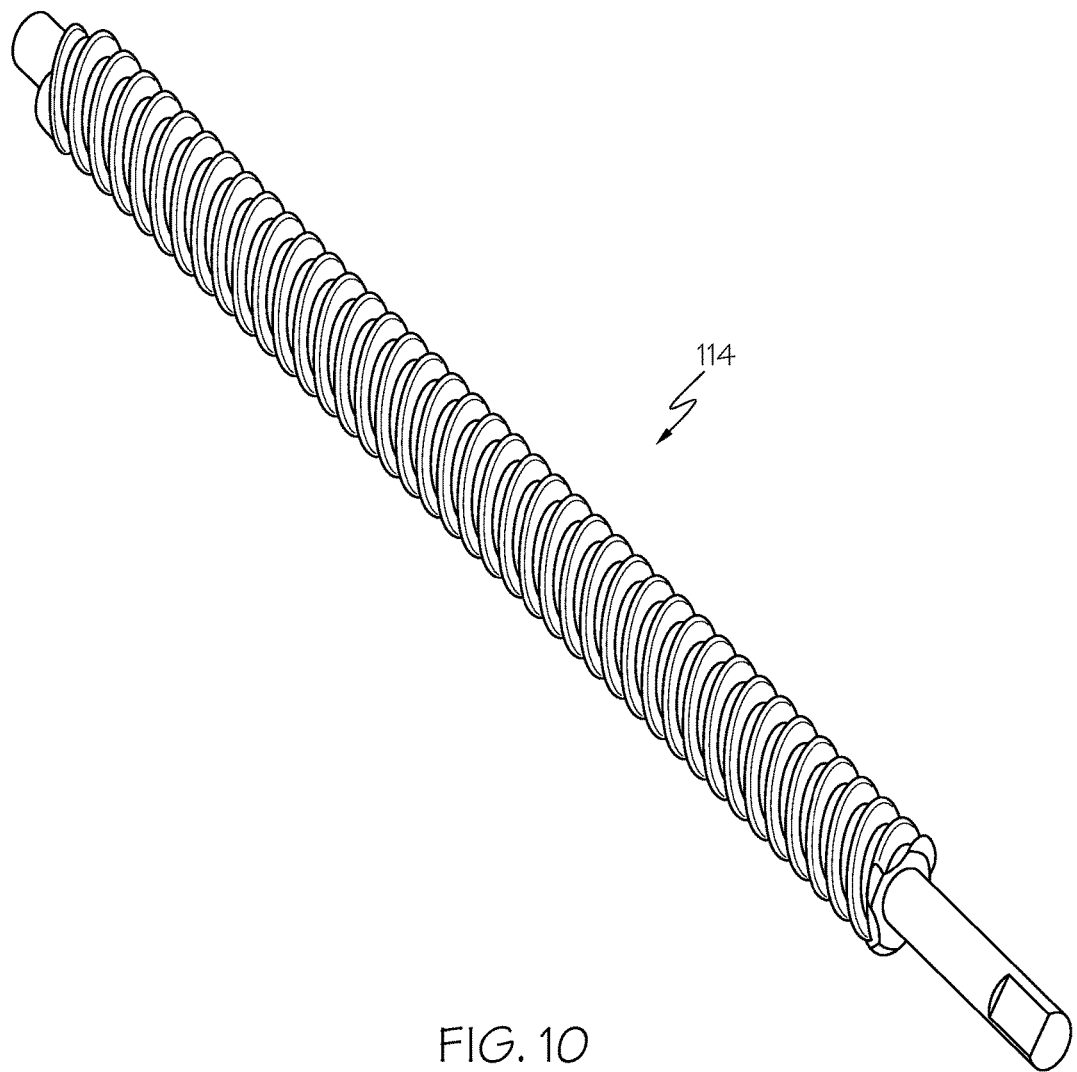
FIG. 10 illustrates a perspective view of a screw shaft of the carriage assembly in accordance with the disclosed architecture.

As illustrated in FIGS. 4 and 9, the cutter bracket or base element 104 preferably cooperates with a mounting frame 106 and a strike plate 108, which functions as an anvil for a cutting element 134. The mounting frame 106 and the strike plate 108 may be integrated into a single unit, or the strike plate 108 may be separate and detachable for replacement due to wear or as otherwise needed. The base element 104 may be manufactured from aluminum, mild steel, or any other suitably material. The material used to construct the base element 104 or, if applicable, strike plate 108 in one embodiment, may be softer than the material used to construct the cutting element 134, in order to minimize wear and tear on cutting element 134. If the strike plate element 108 is detachable, the mounting frame 106 and a strike plate 108 may be manufactured from different materials to decrease cost. In one embodiment, the strike plate 108 is positioned adjacent or substantially adjacent to the printer's print head so that as printed upon supply stock 20 is received by cutting apparatus 100 from printer 10 it automatically passes over strike plate 108 where it is sectioned into individual labels or tags by cutting element 134 that are then discharged from cutting apparatus 100 and fall into a basket (not shown), where they may be stored until retrieved by the operator.

As illustrated in FIGS. 3, 4, 8 and 10, carriage assembly 102 further comprises a guide shaft 112 and a worm or screw shaft 114. The guide shaft 112 is a shaft such as, but not limited to, a high pitch linear shaft, capable of moving the cutter assembly 116 across the supply stock 20 in either direction (i.e., forwards or backwards) at production speeds. The guide shaft 112 spans the cutting apparatus 100 between sides of the cutter assembly cover and the pair of side brackets 110, and is located above strike plate 108 but below screw shaft 114.

Screw shaft 114 is typically a threaded rod such as, but not limited to, an acme thread, or any similar threaded rod capable of functioning as a worm screw. In one embodiment, screw shaft 114 may be a McMaster-Carr Ultra-Smooth Threaded Rod 6350K16 with a $\frac{3}{8}^{th}$ inch-5 thread, with a 5:1 speed ratio and a one inch travel/turn. Another embodiment may employ a $\frac{3}{8}$-12 acme thread requiring twelve revolutions per inch of travel. The screw shaft 114 also spans the cutting apparatus 100 between the pair of side brackets 110 and is located above both the guide shaft 112 and the strike plate 108. One end of the screw shaft 114 may penetrate one of the pair of side brackets 110 so that it can engage a drive element 146 as illustrated in FIGS. 2 and 3 and described infra.

Figure 5A:
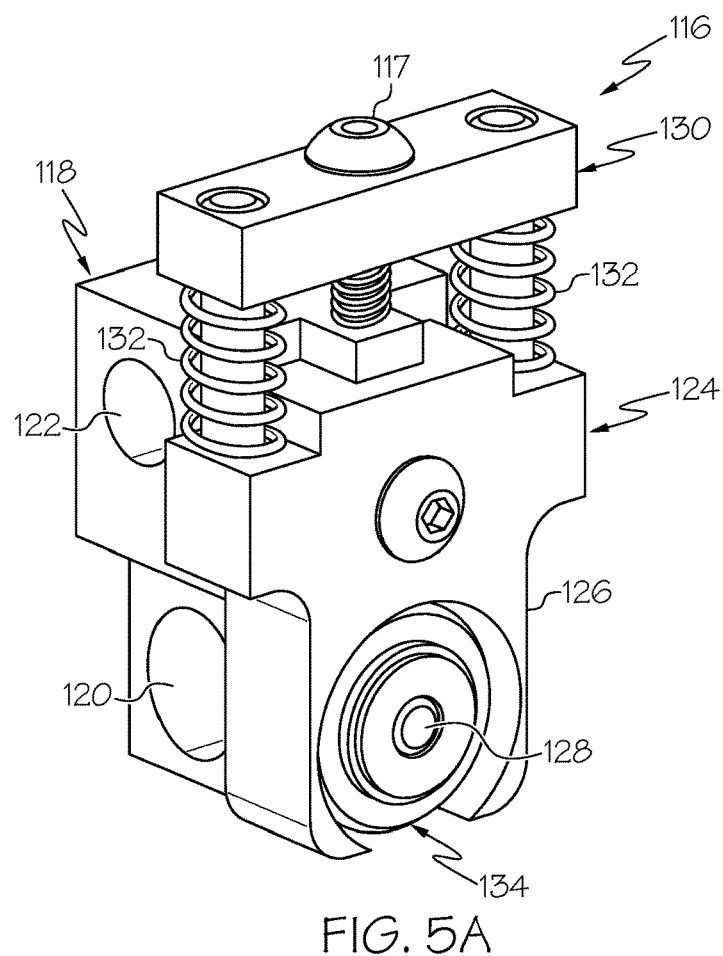
FIG. 5A illustrates a perspective view of one embodiment of a cutter assembly of the cutting apparatus of the present invention in accordance with the disclosed architecture.
Figure 5B:
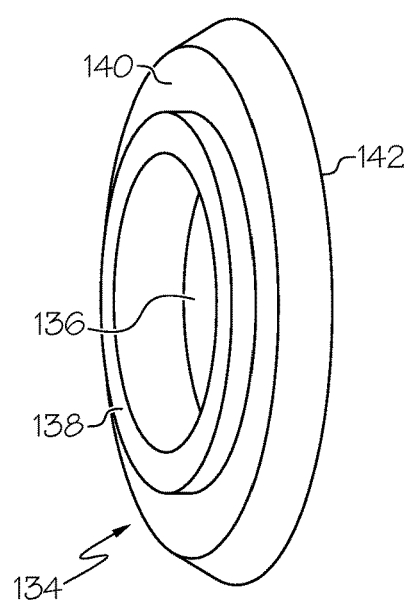
FIG. 5B illustrates a perspective view of one embodiment of a cutting element or wheel of the cutter assembly of FIG. 5A in accordance with the disclosed architecture.
Figure 6:
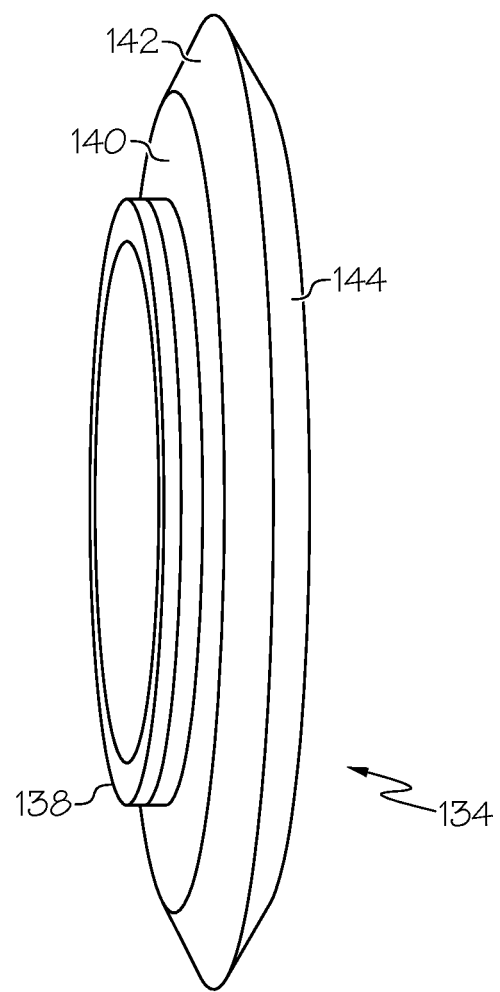
FIG. 6 illustrates a perspective view of one embodiment of a cutting element comprising a blade portion having a first bevel and a second bevel in accordance with the disclosed architecture.
Figure 8:
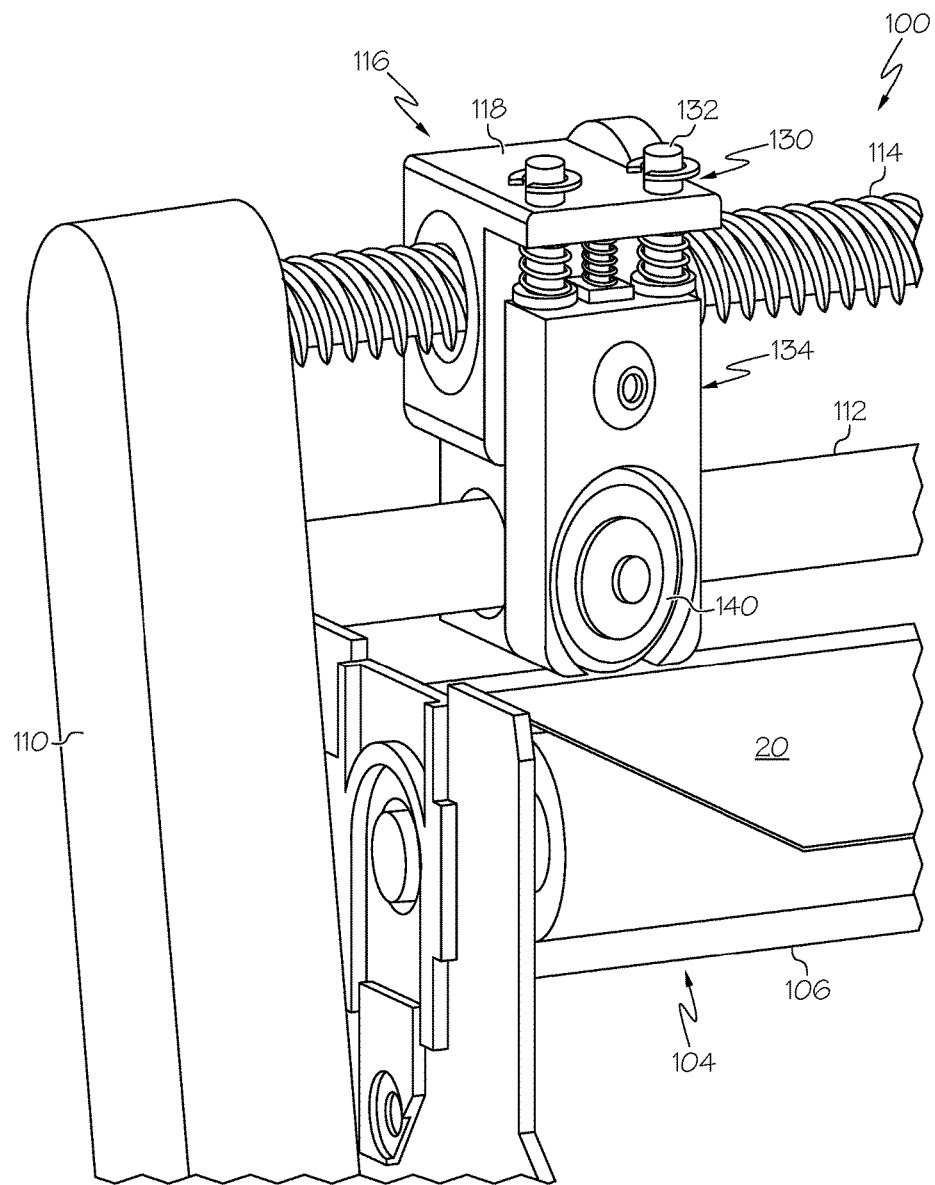
FIG. 8 illustrates a partial perspective view of a portion of an alternative embodiment of the cutting apparatus in accordance with the disclosed architecture.

As illustrated in FIGS. 5A and 8, cutter assembly 116 comprises cutting element 134, a guide element 118, a cutter holder 124, and a pressure adjusting element 130. The guide element 118 comprises a continuous guide shaft hole or opening 120 for receiving and engaging the guide shaft 112, and a continuous screw shaft hole 122 located above the guide shaft hole/opening 120 for receiving and engaging screw shaft 114. The pressure adjusting element 130 may be a separate component, or may alternatively be integrated into a top of the guide element 118. The pressure adjusting element 130 comprises a plurality of adjusters 132 such as, but not limited to, screws, pins, rod and/or spring components, or any similar type of adjusting element known to one of ordinary skill in the art. The plurality of adjusters 132 enable the cutter holder 124 to be repositioned relative to pressure adjusting element 130 to adjust the distance therebetween. For example, in FIG. 5A, an operator may increase or decrease the distance by turning fastener 117 in a clockwise or counterclockwise direction, respectively. Generally, the shorter the distance between cutter holder 124 and pressure adjusting element 130, the greater the pressure or force the cutting element 134 exerts on the supply stock 20 and the strike plate or anvil 108.

Cutter holder 124 comprises a guard portion 126 for retaining cutting element 134 and an axle 128 for rotatably holding cutting element 134 in place. The cutter holder 124 may be manufactured from any durable material, such as metal or plastic, and may be manufactured additively, by injection molding, or any other suitable manufacturing technique. Additionally, the cutter holder 124 may be detached from cutter assembly 116 so that a user can replace the entire cutter holder assembly (including cutting element 134) when, for example, cutting element 134 becomes dull or damaged, all without risk of injury. Alternatively, the cutting element 134 may be removed by itself for individual replacement or repair (e.g., sharpening), as desired.

As illustrated in FIGS. 5B, 6, and 7A-C, the cutting element 134 is typically a wheel knife that is retained by the cutter holder 124. The cutting element 134 may comprise a shaft hole 136, an inner lip 138, and a blade portion 140. The blade portion 140 may be inset within the guard portion 126 of the cutter holder 124 to protect both the operator and the sharp edge from being damaged. Cutting element 134 is easily replaceable, and may be manufactured from tool steel, carbide compounds, or any similar material known to one of ordinary skill in the art for use in cutting implements. When cutting the supply stock 20, the cutting element 134 presses against the stationary strike plate 108 of the carriage assembly 102 to completely sever the supply stock 20. Alternatively, pressure adjusting element 130 may be adjusted or manipulated so that cutting element 134 does not cut through the entire thickness of supply stock 20 (also known as a "kiss cut"), as may be desired by a user.

Figure 7A:
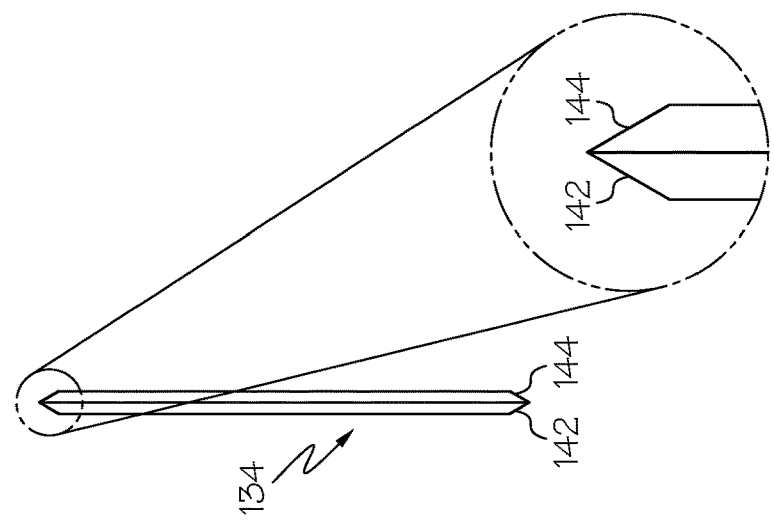
FIG. 7A illustrates a plan view of one embodiment of beveled angles for the blade portion of the cutting element in accordance with the disclosed architecture.
Figure 7B:
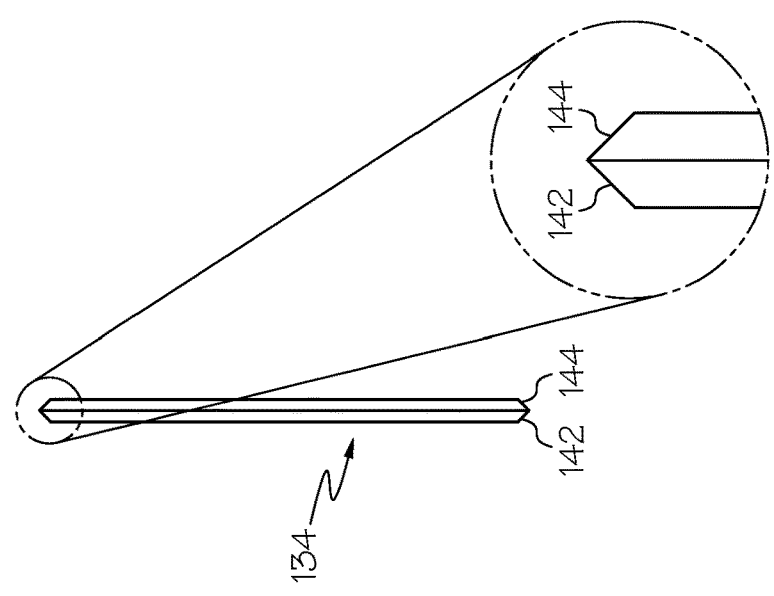
FIG. 7B illustrates a plan view of an alternative embodiment of beveled angles for the blade portion of the cutting element in accordance with the disclosed architecture.
Figure 7C:
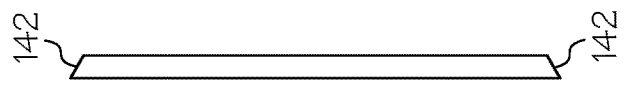
FIG. 7C illustrates a plan view of a further alternative embodiment of a beveled angle for the blade portion of the cutting element in accordance with the disclosed architecture.

As best illustrated in FIG. 7C, blade portion 140 of cutting element 134 may comprise a first bevel 142. An angle of the first bevel 142 may vary based on the material and/or thickness of the supply stock 20 to be cut, and an operator can select an appropriate angle of bevel to administer the proper force necessary to cut the supply stock 20 cleanly and efficiently. While any angle may be used, embodiments of the present invention may employ bevel angles ranging from approximately 25 to approximately 60 degrees depending on the particular application.

As best shown in FIGS. 7A-B, blade portion 140 may further comprise a second bevel 144 with a similar angle to first bevel 142 to increase cutting efficiency when cutting in both back and forth directions. Additionally, the second bevel 144 may create a smaller contact point which reduces adhesive displacement on the stock supply 20 and improves blade life by keeping the blade portion 140 substantially free of adhesive buildup that may otherwise result from repeated contact with supply stock 20, and result in the dulling of blade 140. Any number of bevels for the blade portion 140 is contemplated by the present invention.

Experimentation shows that supply stock 20 cut quality is generally equal in both cutting directions when using a cutting element 134 such as a carbide cutting element with a pressure of approximately 5.4 lb./in, or a tool steel cutting element 134 with a pressure of approximately 4.2 lb./in. Testing with a 60 degree inclusive double bevel wheel knife also demonstrates that cutting spring force is approximately equal to 3.3 lb./in; force for a 25 degree single bevel carbide wheel knife is approximately equal to 5.4 lb./in; and force for a 25 degree single bevel tool steel 110895 is approximately equal to 5.4 lb./in. Nonetheless, other pressures and bevel angles are also contemplated without affecting the overall concept of the present invention.

Figure 11:
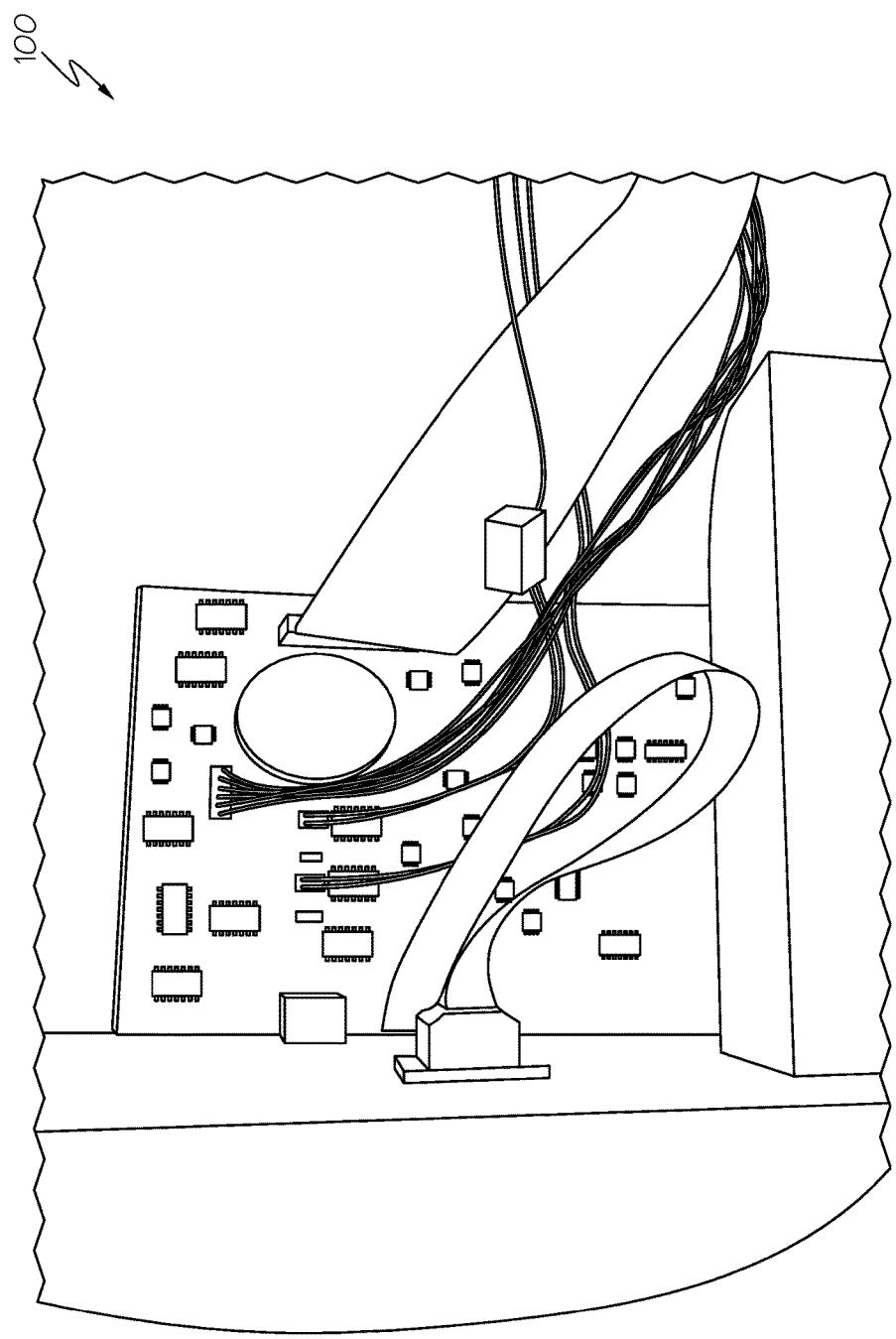
FIG. 11 illustrates a cut away view of one potential embodiment of the various controls of the cutting apparatus of the present invention in accordance with the disclosed architecture.

As best shown in FIG. 3, combination printer and cutting device or cutting apparatus 100 may further comprise a drive element 146 and a motor 147 for operating drive element 146. Drive element 146 may be a belt, pulley, shaft, and the like, or any element capable of rotating screw shaft 114. Motor 147 is typically a stepper motor controlled by associated firmware, carriage sensor support, an independent PC board, and power support as generally illustrated in FIG. 11, however, the present invention contemplates any type of motor. Additional control may be exerted with fixed pressure settings, "C" type sensors or micro switches instead of mechanical switches, a lower turn bar, and a media tensioner. Reconfiguring an existing ADTP1 printer to utilize the subject invention requires replacing the platen roller frame and adding a stepper motor circuit to drive the carriage stepper motor.

In a preferred embodiment of the present invention, motor 147 requirements and operating parameters for the screw driven concept may comprise one or more of the following: (i) a maximum peak torque to drive shaft at 5.8 lb./in load in the cutter wheel is approximately equal to 12.3 oz./in; (ii) a minimum peak torque to drive shaft at 4.2 lb./in load in the cutter wheel is approximately equal to 8.75 oz./in; (iii) the full travel distance for a four inch wide media is approximately 4.5 inches including ramp up and ramp down; (iv) 10T timing pulley on a threaded shaft; (v) 20T timing pulley on motor; (vi) cutter travel time on a test bed is approximately equal to a three second cycle with a two second cut time with a twelve revolution to one inch travel; and (vii) changing the wheel knife profile to a double bevel reduces cutter load force. Notwithstanding, the forgoing parameters are presented for illustrative purposes only and should not be construed as limitations as the cutting apparatus 100 of the present invention is contemplated to also operate in accordance with various other parameters.

Figure 12A:
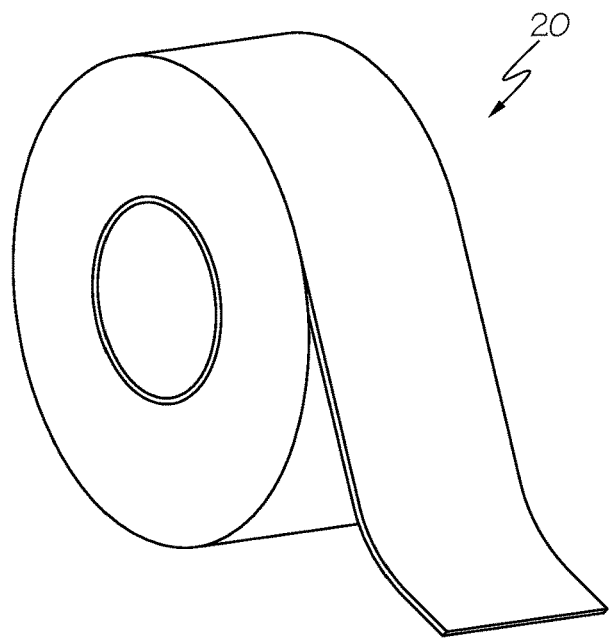
FIG. 12A illustrates a perspective view of a supply stock in accordance with the disclosed architecture.
Figure 12B:
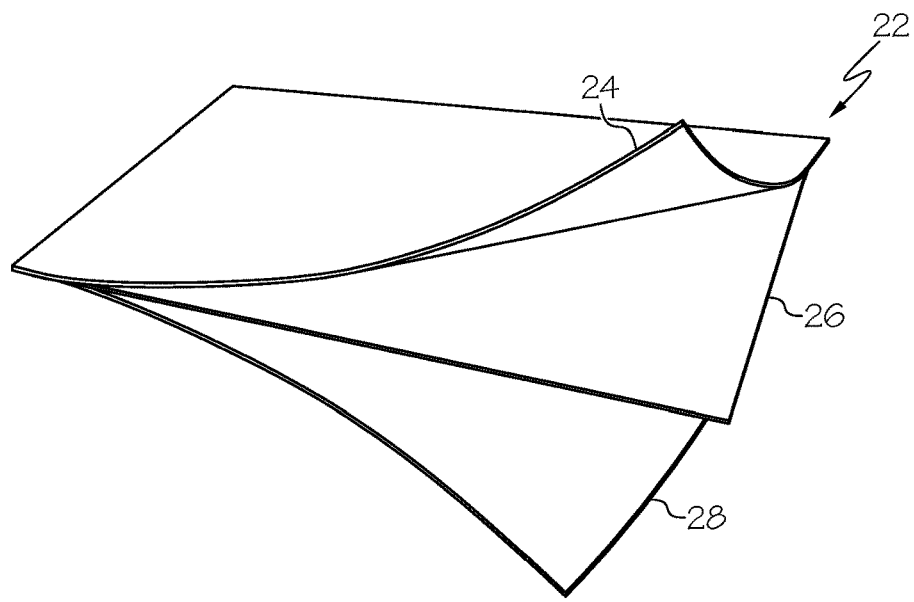
FIG. 12B illustrates a perspective view of a portion of the supply stock of FIG. 12A in accordance with the disclosed architecture.

As previously discussed, the combination printer and cutting device of the present invention is used to print upon and then cut or "kiss cut" supply stock 20. As illustrated in FIG. 12A, supply stock 20 may comprise a web or roll of the tag or label stock material that may be printed upon by printer 10, and then cut by the cutting apparatus 100 into individual tags or labels. Additionally, supply stock 20 could be fed in a roll to roll matrix with an external liner take-up containing the cut label matrix. As illustrated in FIGS. 12A and 12B, the supply stock 20 may be cut into a portion 22 of the supply stock 20, such as a label. The cutting apparatus 100 may be designed to employ variable cuts on demand so that the portion of the supply stock 22 may vary in size and/or shape as desired. Further, the cutting apparatus 100 of the present invention may be used to make "kiss cuts", meaning that only the top layer of a label stock 20, such as a pressure sensitive label stock, may be cut, while the backing remains intact.

Figure 13:
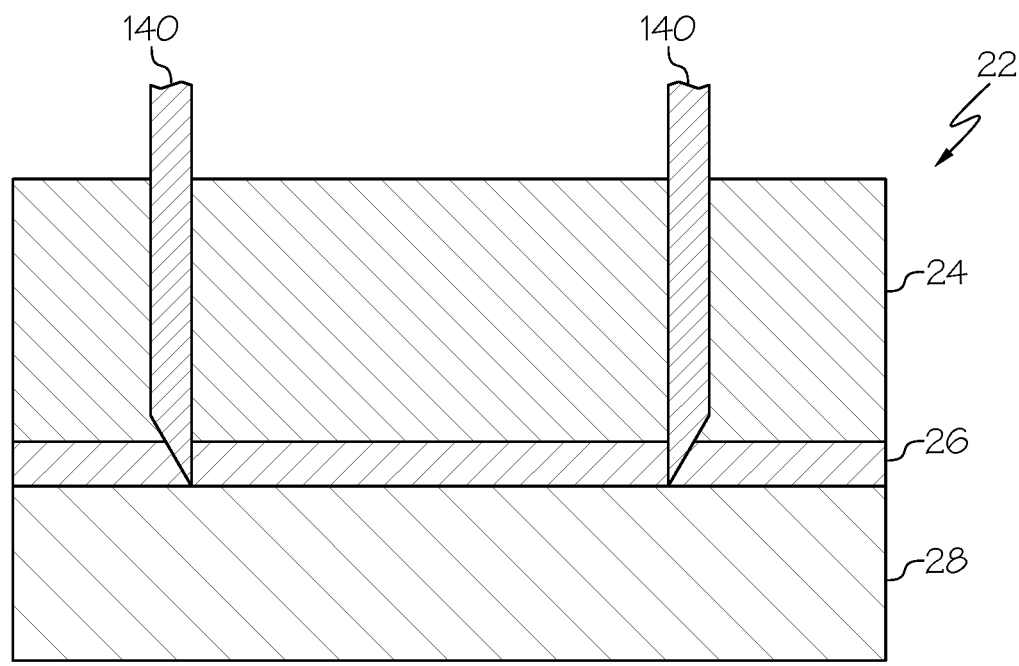
FIG. 13 illustrates a side cross-sectional view of the blade portion of the cutting element engaging a portion of the supply stock in accordance with the disclosed architecture.

More specifically and as shown in FIG. 12B, supply stock 20 may comprise a top or face element 24, an adhesive element 26, and a liner element 28. The face element 24 may be manufactured from a thermal direct or thermal transfer paper, or any other suitable label material. The adhesive element 26 may be manufactured from a true cut adhesive designed not to flow into the area of a cut and is positioned or sandwiched between said face element 24 and liner element 28. The liner element 28 may be manufactured from a backer material such as, but not limited to, BG30, BG25, PET12, or the like. As illustrated in FIG. 13, and explained more fully below, the cutting apparatus 100 may be configured to cut the supply stock 20 to a depth that does not completely penetrate the supply stock 20. More specifically, pressure adjusting element 130 of cutting apparatus 100 may be configured to cut through face element 24 and adhesive element 26, but not into or through backing paper or liner element 28.

The continued description below relates to an alternative embodiment of the cutter assembly. Except as otherwise noted, the alternative embodiment of the cutter assembly of the present invention utilizes similar drive components except that the cutting pressure applied by said cutter assembly to supply stock 20 is not adjustable but rather is a fixed load as assembled, and the cutting depth is controlled by the diametric differences of the cutter wheel/blade and an adjacent bearer roller, as well as additional cutting depth controls that are adjustable by an operator.

Other differences between cutter assembly 116 and the alternative embodiment of the cutter assembly 424 are described more fully below and in FIGS. 14-31. While a number of said FIGS. depict alternative cutter assembly 424 as an integral part of printer 10, such as for example an ADTP1 or ADTP2 printer presently manufactured and sold by Avery Dennison Corporation of Pasadena, Calif., it should be appreciated that said FIGS. are for illustrative purposes only, and that alternative cutter assembly 424 may also be used with cutting apparatus 100 as a printer accessory (i.e., not integrally housed in printer 10).

Figure 14:
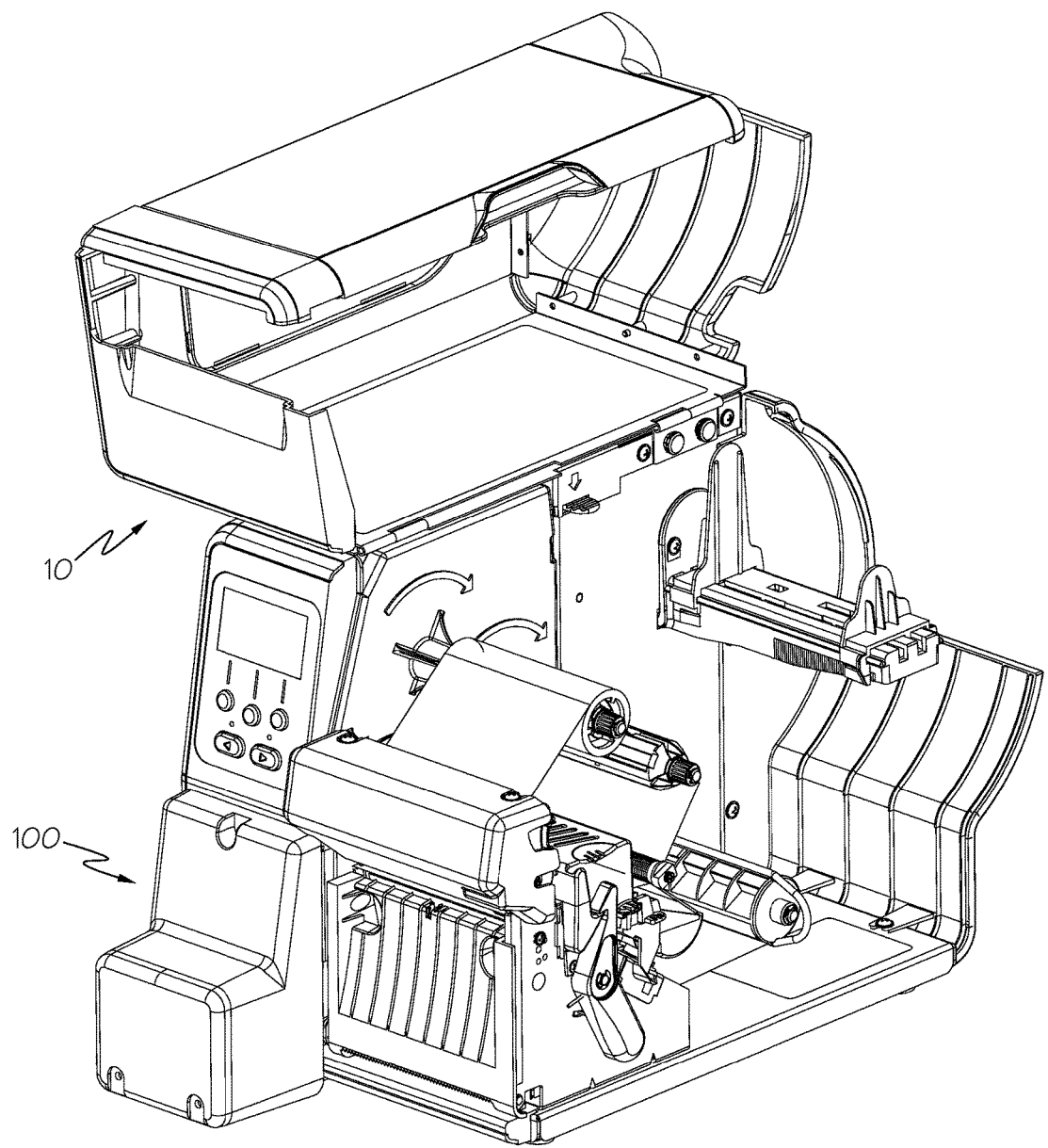
FIG. 14 illustrates a perspective front view of an alternative embodiment of a cutting apparatus mounted to a printer with a roll of supply stock installed thereon, all in accordance with the disclosed architecture.
Figure 15:
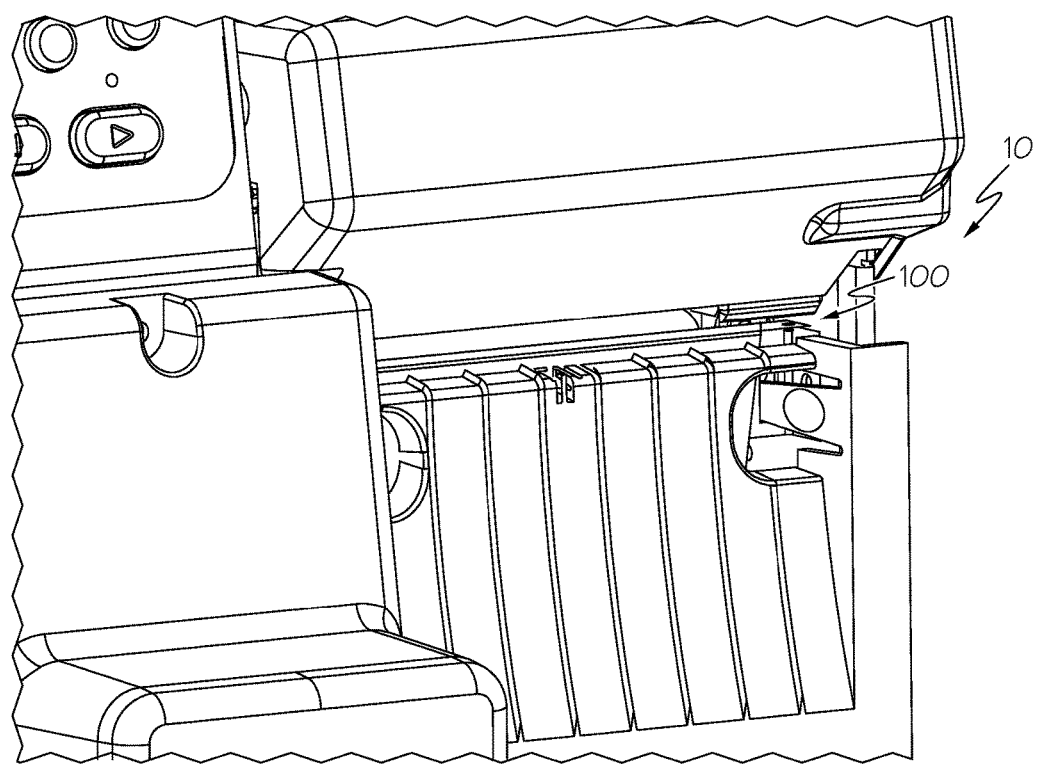
FIG. 15 illustrates an enlarged perspective view of an exit area of the combination printer/cutting apparatus in accordance with the disclosed architecture.

FIG. 14 illustrates a perspective front view of an alternative embodiment of a cutting apparatus mounted to printer 10 with a roll of supply stock 20 installed thereon, and FIG. 15 illustrates an enlarged perspective view of an exit area of the combination printer and cutting device of the present invention with a wide throat area to facilitate the delamination and removal of newly cut labels or other materials from the liner carrier web.

The cutting apparatus 100 comprises a carriage assembly 102. As in previous embodiments, the carriage assembly 102 comprises a base element 104, a guide shaft 112, and a screw shaft 114. The base element 104 comprises a mounting surface 106, such as a frame, and a strike plate 108. In the prior embodiments described above, the guide shaft 112 was positioned below the screw shaft 114, and downstream of a supply path of the supply stock 20. Additionally, in previous embodiments, the screw shaft 114 was positioned above the guide shaft 112, and was offset from the applied cutting forces of cutting apparatus 100.

However, in the alternative embodiment of the present invention, the locations of the guide shaft 112 and the screw shaft 114 are reversed so that the screw shaft 114 is positioned below the guide shaft 112. In this lower position, screw shaft 114 is closer and more normal (i.e., at an approximate right angle) to opposing cutting forces as practical, which minimizes cantilevered loads and reduces the potential for long term wear on the various moving components, while still permitting an operator easy and open access to cutting apparatus 100 to remove the cut or "kiss cut" labels. Further, in this particular embodiment, the upper guide shaft 112 is now positioned further away from screw shaft 114 to reduce the rotational load on the sliding guide features. Additionally, the cutting anvil or strike plate 108, which is typically considered a wear item, may be screwed or otherwise attached into position on the mounting surface 106 and configured symmetrically so as to be able to be reoriented 180° and/or flipped over. In this manner, the cutting anvil or strike plate 108 could have up to four separate useful lives before having to be replaced, thereby resulting in cost savings to the user and less downtime for the device and its operator.

Figure 16:
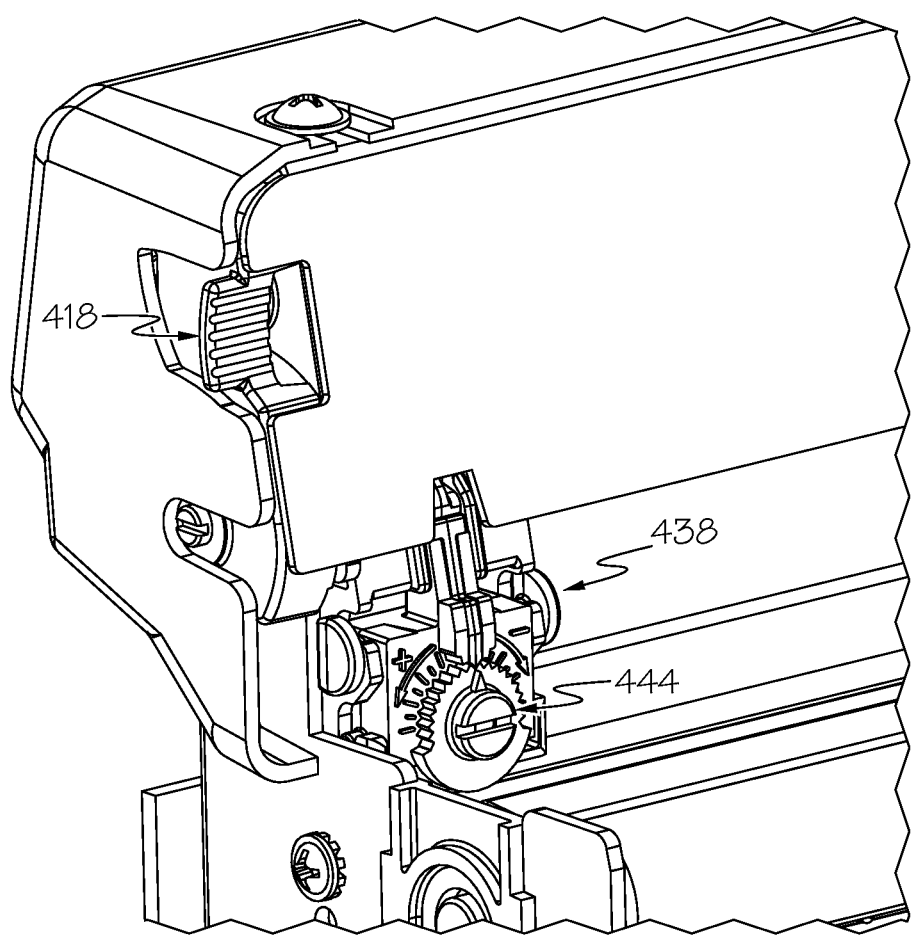
FIG. 16 illustrates an enlarged perspective view of a portion of the cutter assembly of the cutting apparatus of FIG. 14 in the home position and in accordance with the disclosed architecture.
Figure 17:
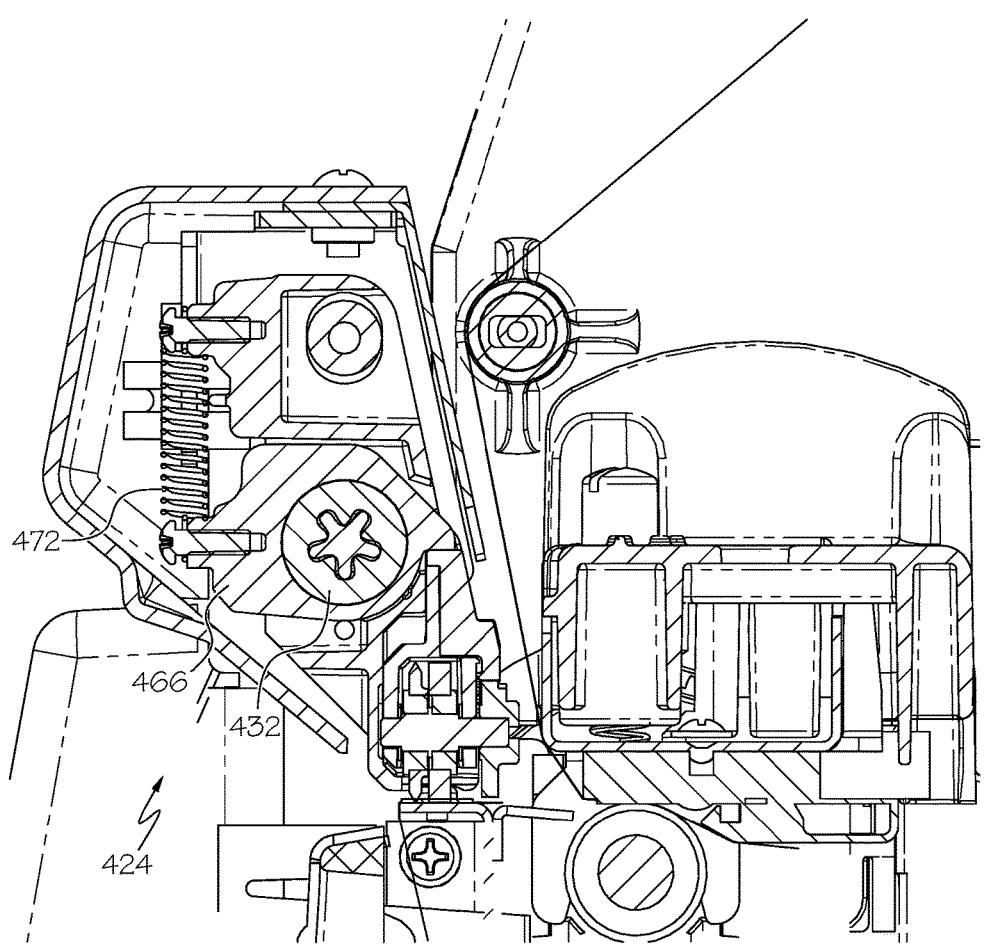
FIG. 17 illustrates an enlarged perspective side cross sectional view of the alternative embodiment of the cutter assembly of FIG. 14 in accordance with the disclosed architecture.
Figure 18:
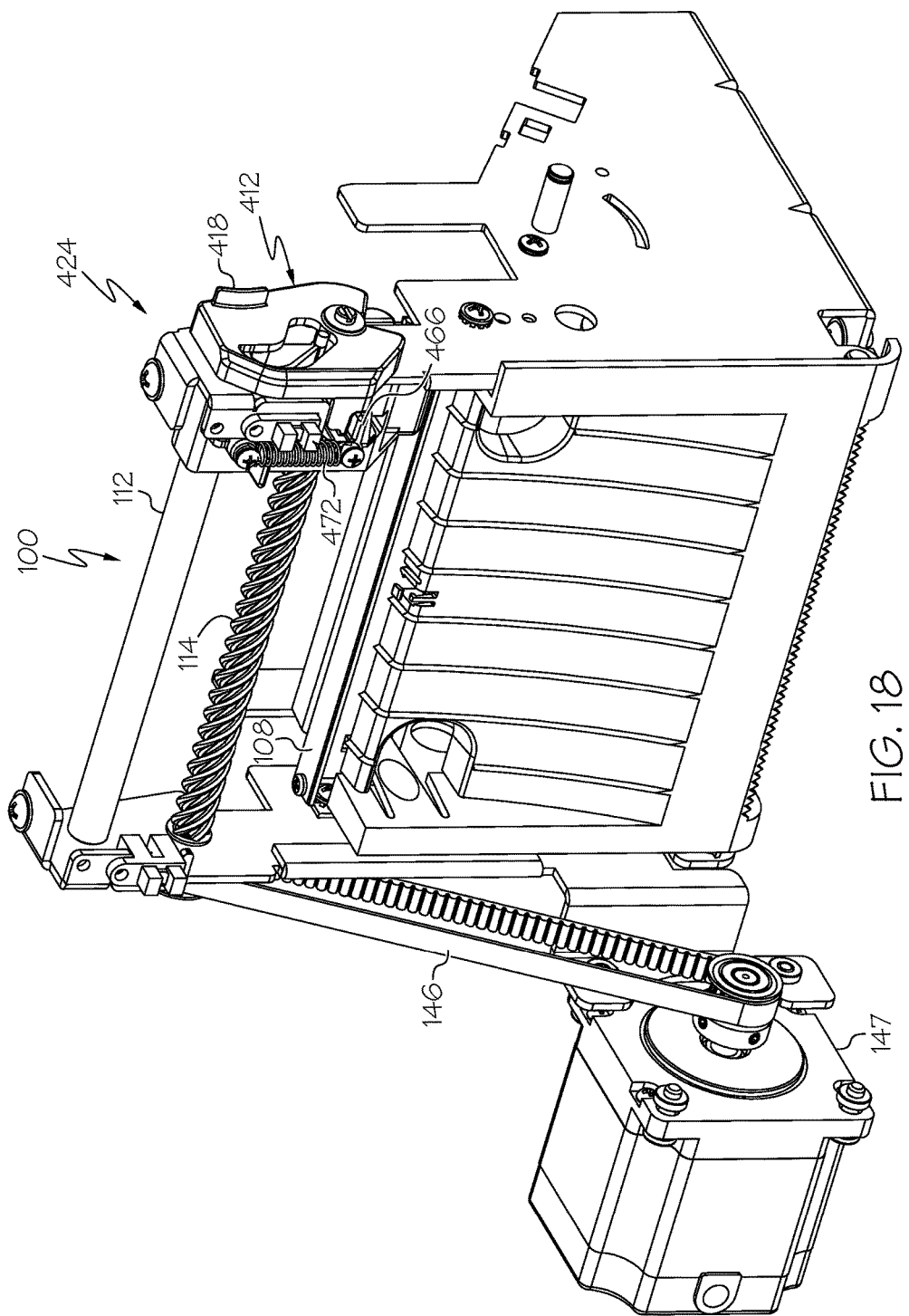
FIG. 18 illustrates a perspective rear view of the alternative embodiment of the cutter assembly of FIG. 14 in accordance with the disclosed architecture.
Figure 19:
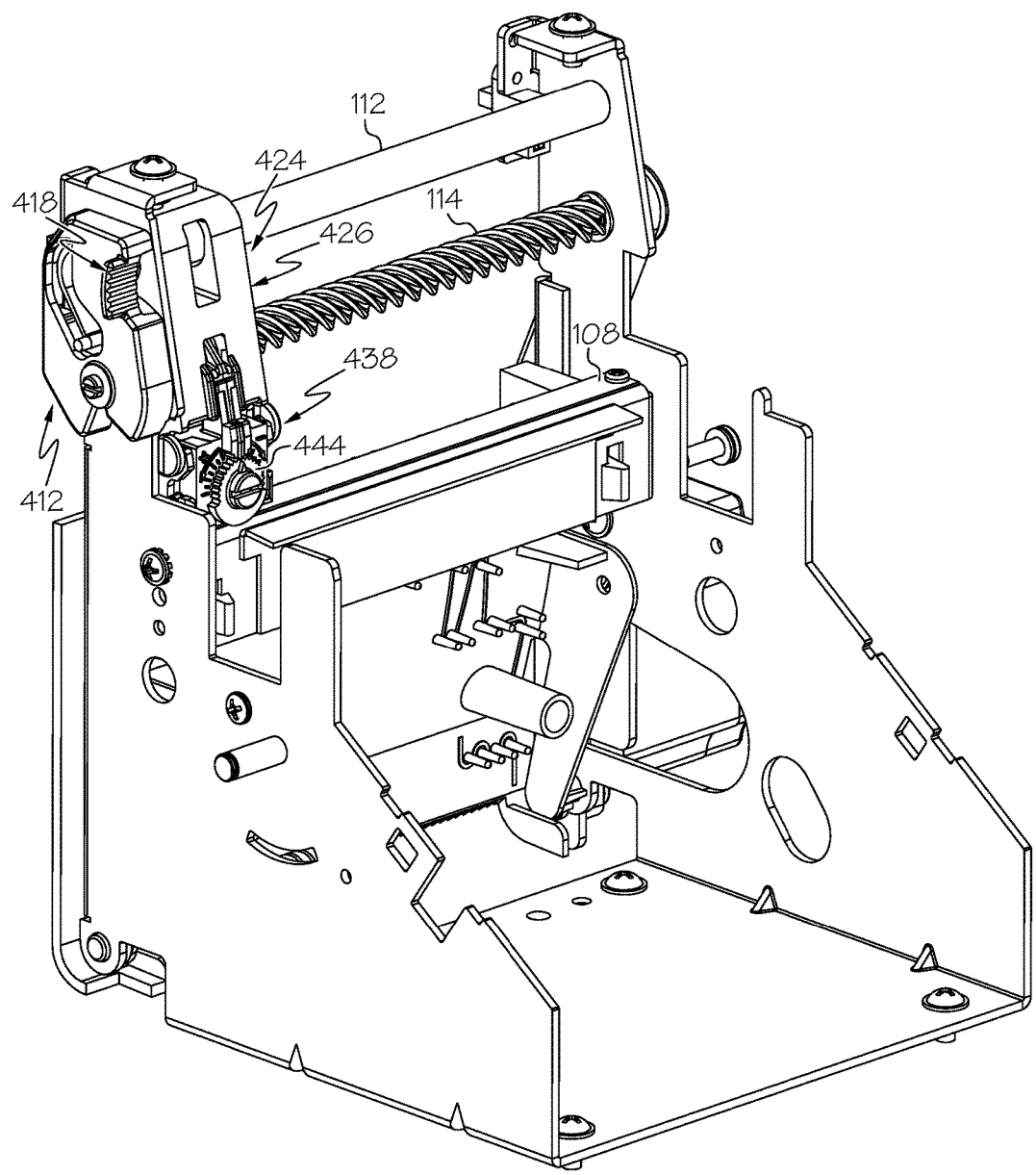
FIG. 19 illustrates a perspective front view of the alternative embodiment of the cutter assembly of FIG. 14, with covers removed, in accordance with the disclosed architecture.
Figure 20:
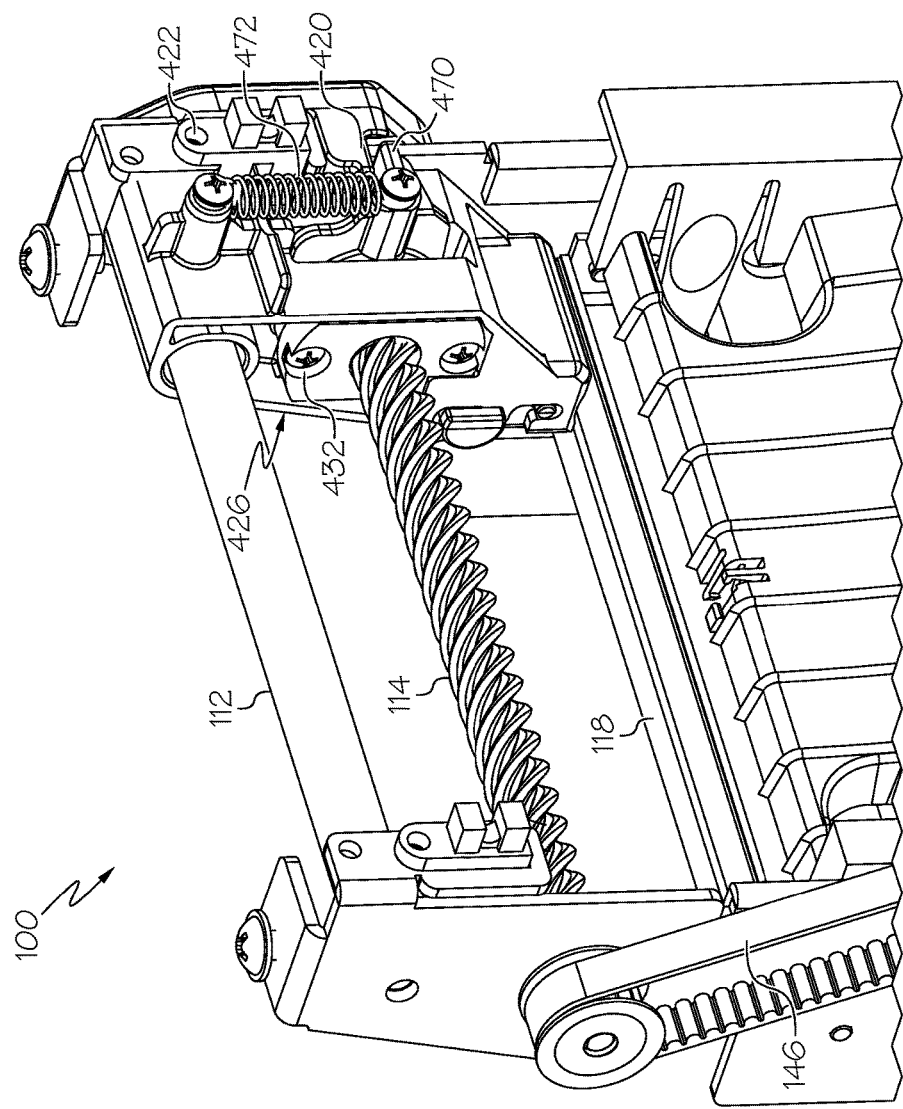
FIG. 20 illustrates a perspective rear view of the alternative embodiment of the cutter assembly of FIG. 14, with covers removed, in accordance with the disclosed architecture.

Having described the general differences between other components of cutting apparatus 100 necessary to function with alternative cutter assembly 424, the actual cutter assembly will now be described in greater detail. FIGS. 17-20 all illustrate portions of cutter assembly 424 in the home position, and ready to receive cutting instructions and begin a cutting process. More specifically, FIG. 16 is an enlarged perspective view of a portion of cutter assembly 424, partially obstructed by a protective cover, and FIG. 17 illustrates an enlarged perspective side cross-sectional view of the cutter assembly 424. FIG. 18 illustrates a perspective rear view of cutter assembly 424 with the protective cover removed, and FIGS. 18-20 show a wide-angled exit opening of cutting apparatus 100 and cutter assembly 424, allowing for easy removal of a cut label from a supply stock 20. This also allows an operator easy access to install or load the supply stock 20 into cutting apparatus 100.

Cutter assembly 424 comprises a cutter carrier 426 and a removable cutter cartridge 438, each of which are described more fully below. Additionally, in this particular embodiment of the present invention and as best shown in FIGS. 18-20, the cutting apparatus 100 further comprises a cartridge release actuator 412 (also indicated by 416) comprising a cartridge release tab 418 and an actuator tab 420. The cartridge release actuator 416 (412) is preferably positioned on the "home" side of cutting apparatus 100 and outboard of cutter assembly 424, which is preferably located on the end of screw shaft 114 opposite that of drive element 146. Cartridge release actuator 412 (416) allows an operator to release and remove cutter cartridge 438 as an entire unit from the cutter carrier 426 of cutter assembly 424 without the need for external tools. More specifically, the operator actuates or presses the cartridge release tab 418 in a backward or counter-clockwise direction which, in turn, permits the cutter cartridge 438 to engage or disengage with the cutter assembly 424. In this manner, cutter assembly 424 can easily be repaired or replaced with minimal effort, risk of injury and/or downtime. As best illustrated in FIG. 20, cutting apparatus 100 may further comprise an optical interrupt sensor 422 and optical interrupt blades or ribs (not shown) on the cutter carrier 426 to allow appropriate sensing for motor control at the end of a cutting process.

Figure 24:
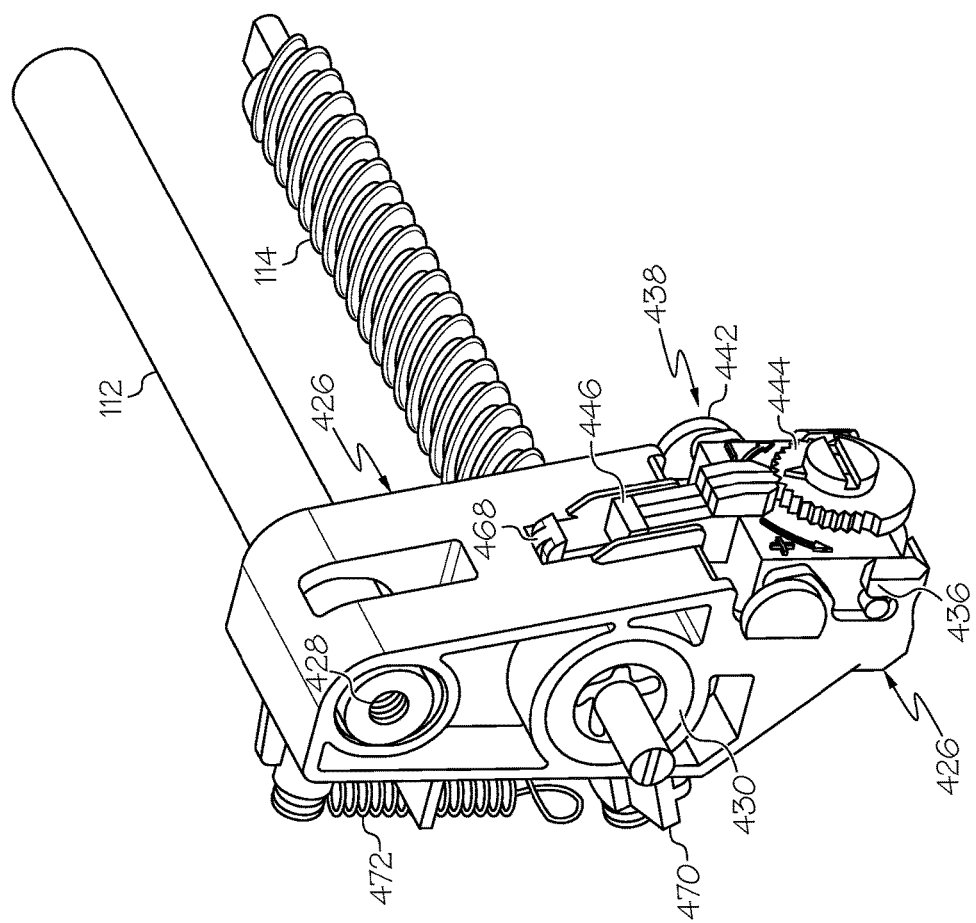
FIG. 24 illustrates a perspective front view of specific components of the alternative embodiment of the cutter assembly of FIG. 14, with the cutter cartridge in a disengaged position in the cutter carrier, in accordance with the disclosed architecture.
Figure 25:
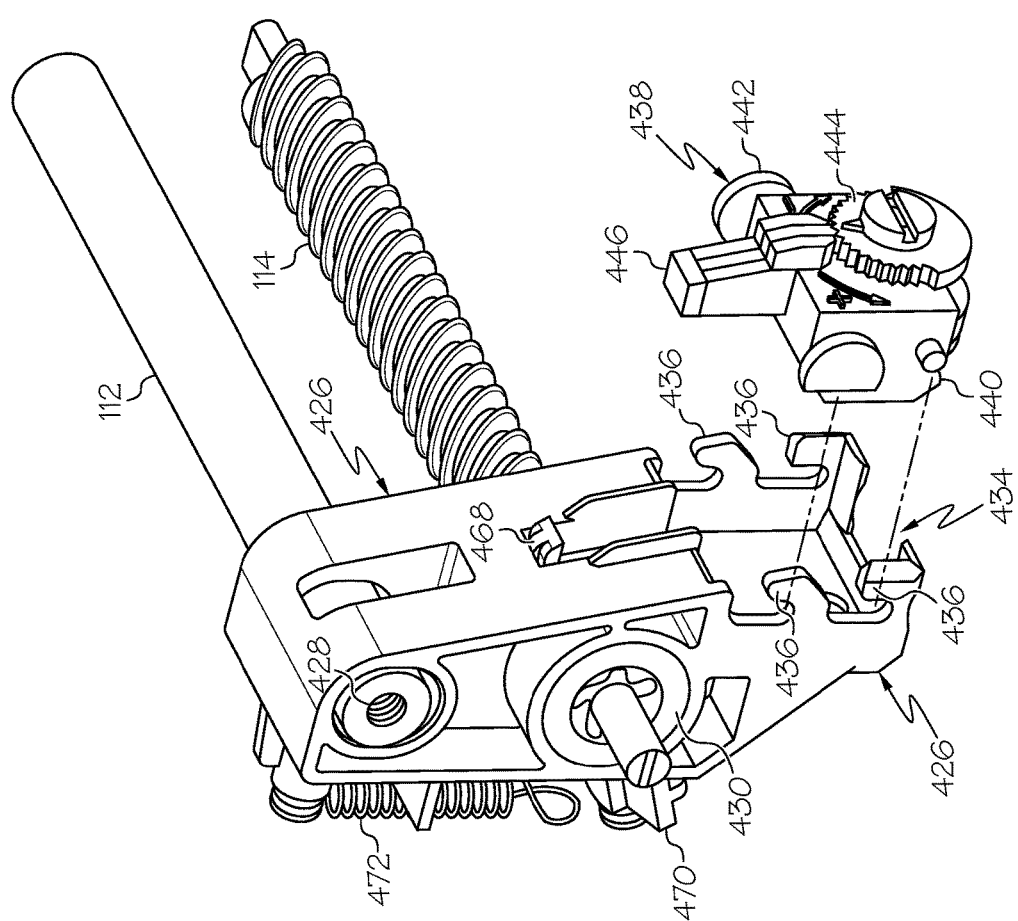
FIG. 25 illustrates a perspective front view of specific components of the alternative embodiment of the cutter assembly of FIG. 14, with the cutter cartridge and release actuator removed and the cutter cartridge displaced from the cutter carrier, in accordance with the disclosed architecture.

The cutter carrier 426 is preferably manufactured from a low friction material, such as, but not limited to, a Teflon filled copolymer to reduce friction and wear of sliding contact surfaces in cooperation with the upper guide shaft 112. As illustrated in FIGS. 24 and 25, the cutter carrier 426 is positioned on an end of guide shaft 112, preferably opposite the side of drive element 146 and comprises a guide shaft hole or opening 428 for accepting and retaining guide shaft 112. The cutter carrier 426 further comprises a worm shaft hole or opening 430 and a worm screw nut 432. The worm shaft hole 430 rotatably accepts the screw shaft 114, which is retained by the worm screw nut 432, as best shown in FIG. 17. The guide shaft opening 428 in this embodiment is located above the worm shaft opening 430. The cutter carrier 426 further comprises a cutter cartridge holder 434 for releasably retaining the cutter cartridge 438. The cutter cartridge holder 434 may comprise a plurality of attachment points 436 such as diametric posts or hooks for cradling or supporting cutter cartridge 438.

FIG. 17 illustrates a cross-section of the cutting apparatus 100, and shows how a spring load is attained and applied to cutter cartridge 438. More specifically, cutting apparatus 100 further comprises a pressure hub 466 and a pressure adjusting element 472. The pressure adjusting element 472 is typically a single spring, such as a compression spring, as described supra. The single spring embodiment of the present invention frees up valuable space required for other component of the printer 10 and cutting apparatus 100 and is less complex to assemble and maintain. Additionally, the use of single spring 472 permits the guide shaft 112 and the screw shaft 114 to be repositioned in relation to the applied resistive forces, thereby avoiding cantilevered loading and decreasing wear on related moving components of cutting apparatus 100.

Figure 27:
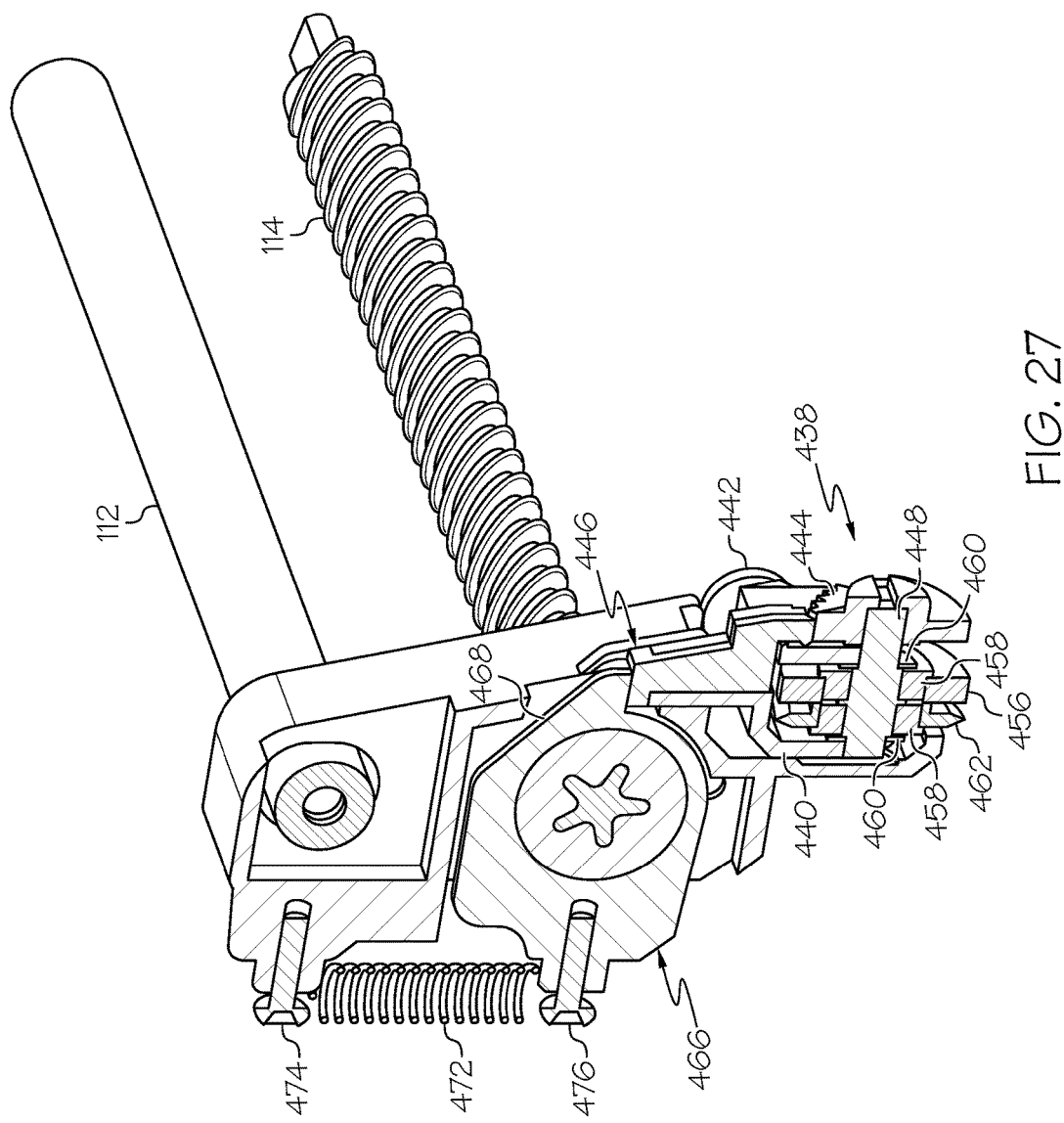
FIG. 27 illustrates a perspective cross-sectional view of the alternative embodiment of the cutter assembly of FIG. 14 with related components in an engaged position and in accordance with the disclosed architecture.

Cutting pressure is applied via the single extension spring 472 outboard of the guide shaft 112 and the screw shaft 114. As illustrated in FIG. 27, the pressure adjusting element/spring 472 is positioned between and attached to a cutter carrier attachment point 474 and a pressure hub attachment point 476, which is attached to or a part of pressure hub 466. The pressure hub 466 is rotatable about the end of screw shaft 114, and is retained by worm screw nut 432. Pressure hub 466 comprises a pressure exerting portion 468 and an actuator tab element 470. More specifically, the tension in extension spring 472 and the rotatable connection of pressure hub 466 about screw shaft 114 results in a downward force or pressure being applied by pressure exerting portion 468 onto a detent component 446 of cutter cartridge 438. This design results in a continuous, direct, in-line pressure being applied to cutting blade 462 of the cutter cartridge 438, while maintaining a compact, simple assembly. All load bearing components are in close proximity to each other and are configured to reduce long term wear, which could result in downtime and lost productivity.

FIGS. 18 and 19 illustrate the cutting apparatus 100 without covers, which includes a motor 147 and belt drive 146 arrangement for rotating screw shaft 114 in a manner similar to that which is described supra. Also specifically illustrated is how a counter-clockwise rotation of the cartridge release actuator 416, from a first position shown in FIG. 21 to a second position in FIG. 22, causes engagement with actuator tab element 470 on the rotatable cut pressure hub 466, which, in turn causes extension spring 472 to elongate. As spring 472 elongates and pressure hub 466 rotates about screw shaft 114 in a counter-clockwise direction, pressure exerting portion 468 disengages from detent component 446 of cutter cartridge 438 to keep it engaged with attachment points 436. With pressure no longer being applied to detent component 446 of cutter cartridge 438, cutter cartridge 438 can easily be removed and re-installed from the cutter carrier 426.

Figure 21:
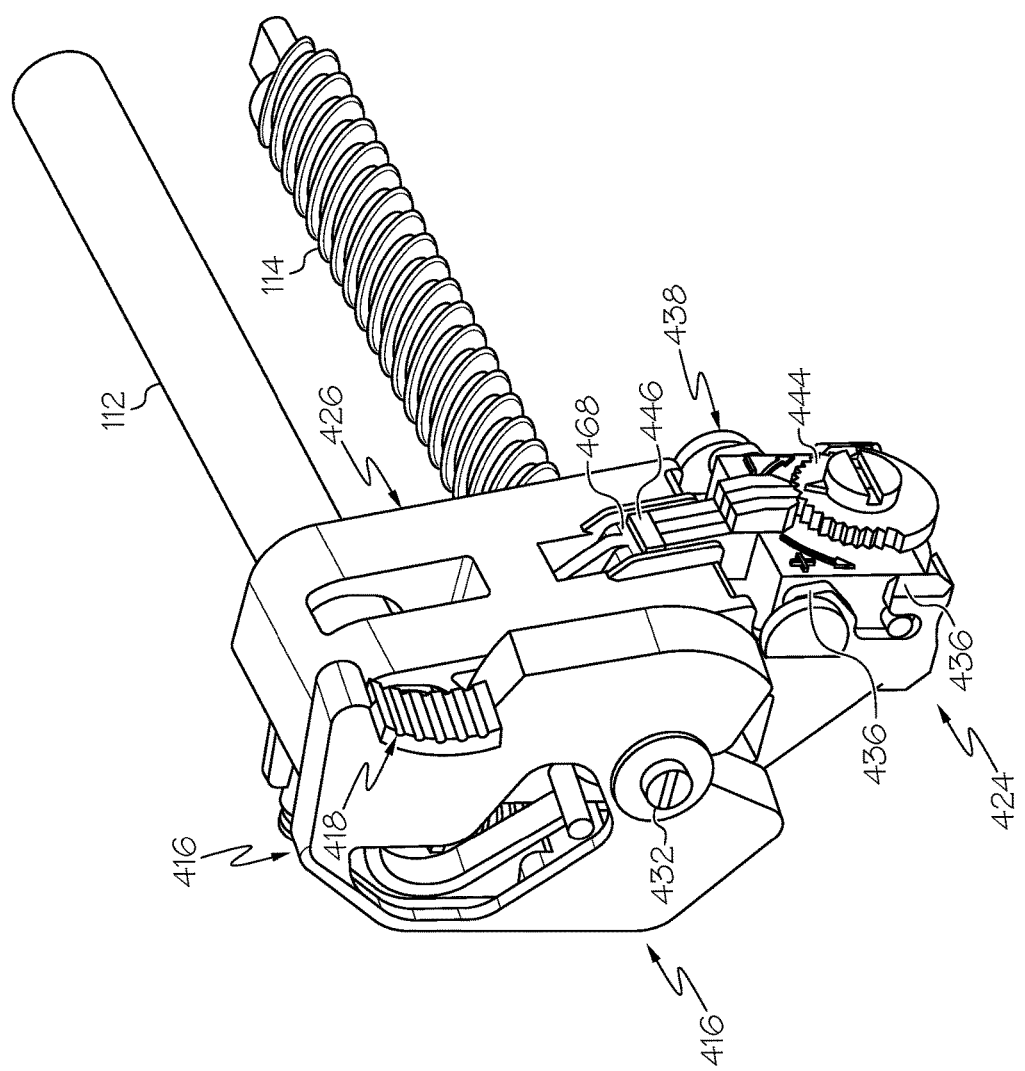
FIG. 21 illustrates a perspective front view of specific components of the alternative embodiment of the cutter assembly of FIG. 14 in accordance with the disclosed architecture.
Figure 22:
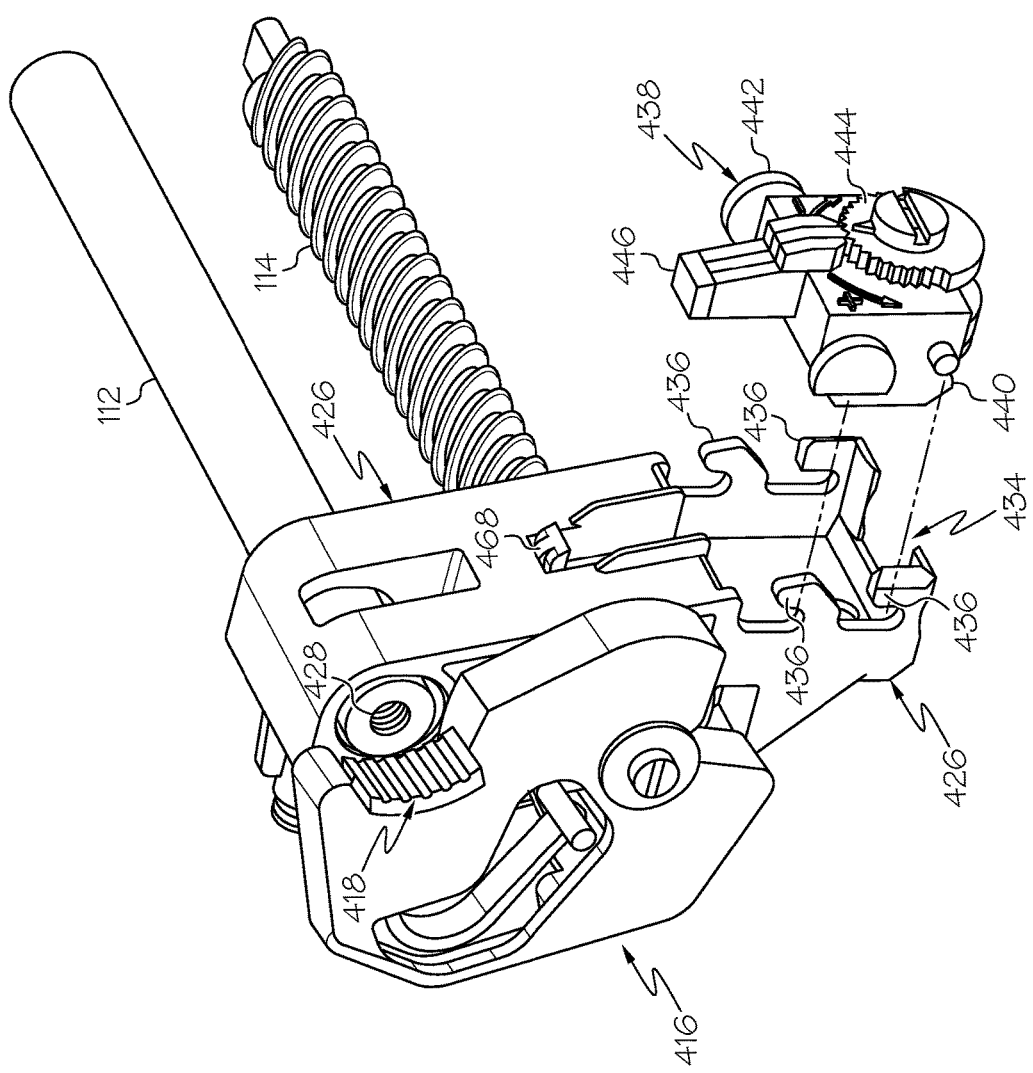
FIG. 22 illustrates a perspective front view of specific components of the alternative embodiment of the cutter assembly of FIG. 14, with the cutter cartridge displaced from the cutter carrier, in accordance with the disclosed architecture.

FIG. 21 illustrates pressure exerting portion 468 engaging, and applying pressure to, detent component 446 of cutter cartridge 438, thereby causing cutter cartridge 438 to be retained in said plurality of attachment points 436 of cutter carrier 426. FIG. 22 illustrates pressure exerting portion 468 disengaged from, and no longer applying pressure to, detent component 446 of cutter cartridge 438, thereby permitting cutter cartridge 438 to be removed from said plurality of attachment points 436 and cutter carrier 426.

Figure 23:
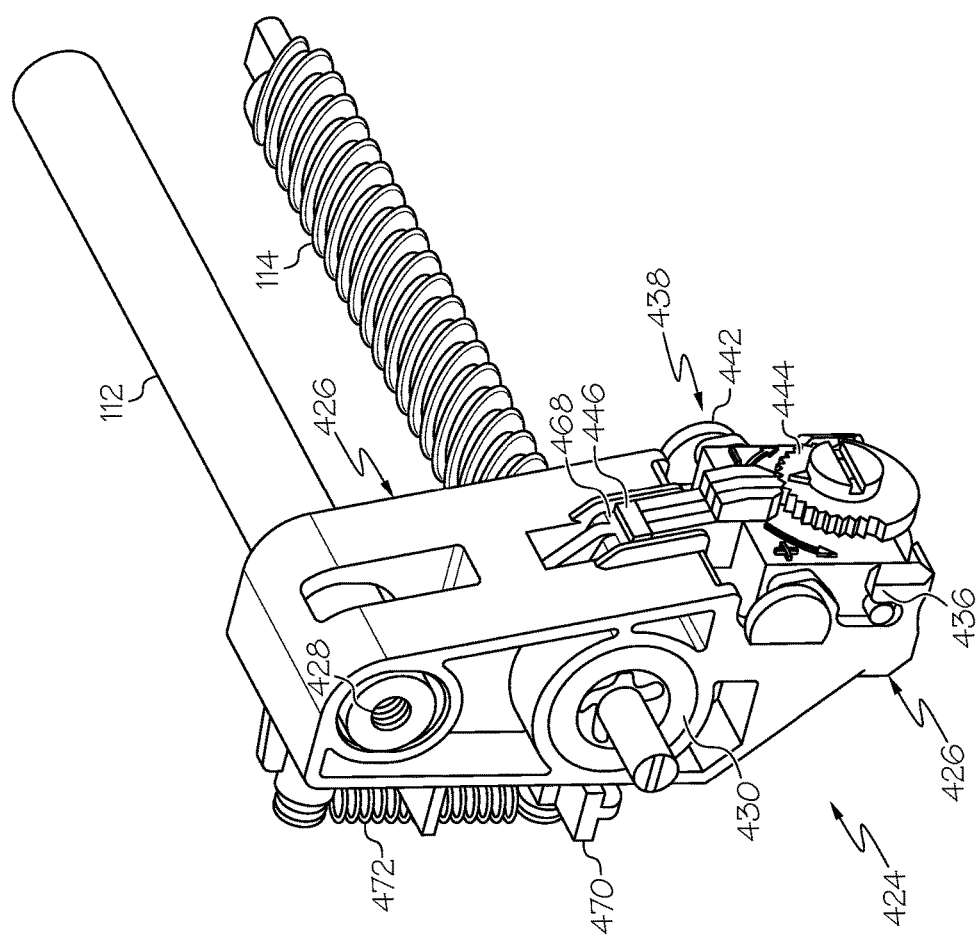
FIG. 23 illustrates a perspective front view of specific components of the alternative embodiment of the cutter assembly of FIG. 14, with the release actuator removed and the cutter cartridge in an engaged position in the cutter carrier, in accordance with the disclosed architecture.

FIG. 23 illustrates a perspective front view of the cutter assembly 424 with the release actuator 416 removed and the cutter cartridge 438 in an engaged position in the cutter carrier 426. FIG. 24 illustrates a perspective front view of the cutter assembly with the pressure hub 466 fully rotated, thereby releasing pressure on the cutter cartridge 438. With said pressure removed, cutter cartridge 438 is shown slid to a top of the retaining slots or the attachment points 436 of the cutter cartridge holder 434 as would be the case during installation or removal of the cutter cartridge 438.

FIG. 25 illustrates a perspective front view of the cutter assembly 424 with the release actuator 416 removed and the pressure hub rotated into the disengaged position, thereby allowing the cutter cartridge 438 to be displaced from the cutter carrier 426. It should be apparent that the four diametric posts of the cutter cartridge 438 align and engage with the four matching slots of the cutter cartridge holder 434 in the cutter carrier 426.

Figure 26:
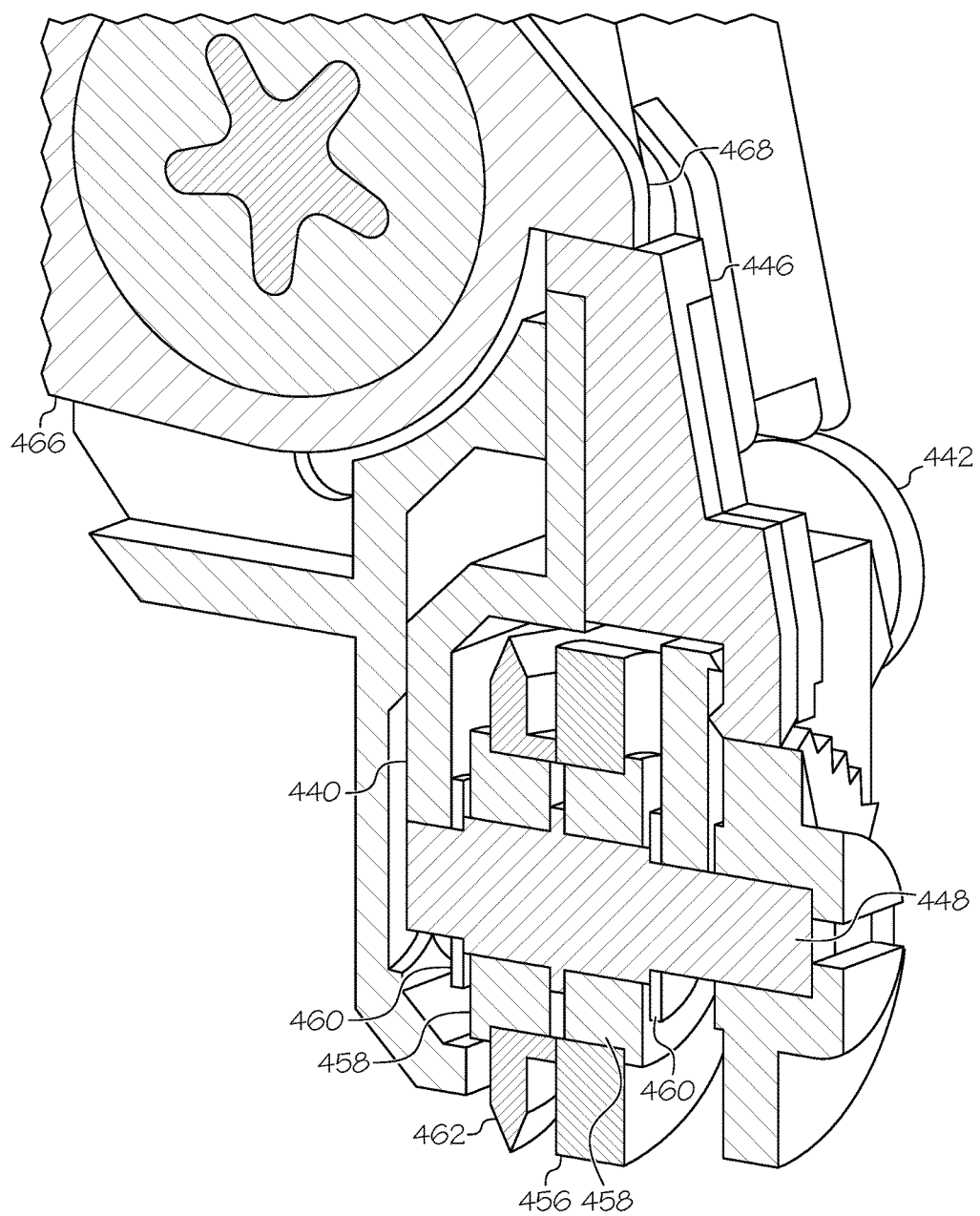
FIG. 26 illustrates an enlarged perspective cross-sectional view of the alternative embodiment of the cutter assembly of FIG. 14 with related components and in accordance with the disclosed architecture.

FIGS. 26 and 27 illustrate, among other things, an enlarged cross-sectional view of the cutter cartridge 438 and its various components. More specifically, cutter cartridge 438 comprises a housing 440, a pair of spaced apart grips or handles 442, a cut depth adjustment knob 444, detent component 446, a pinion shaft 448, a bearer roller 456, a plurality of bearings 458, a plurality of spacers 460, and a cutting blade 462.

Housing 440 is used to support the various components of cutter cartridge 438 and, as best illustrated in FIG. 25, one of said pair of grips 442 is positioned on each side of housing 440 to allow an operator to easily and securely handle cutter cartridge 438, for example, when installing and/or removing the same from cutter carrier 426. As best shown in FIGS. 21-25, rotatable cut depth adjustment knob 444 has a plurality of grooves or notches positioned around at least a portion of its circumference for engaging a pointed portion of detent component 446, and an indicator appearing on its face to permit the operator to adjust and keep track of the amount of its rotation, which represents depth of cut. More specifically, the slideably retained detent component 446 engages with a select one of said plurality of grooves of the cut depth adjustment knob 444 to retain the cut depth adjustment knob 444 in a specific and desired rotationally indexed position and, as described supra, the detent component 446 is held down in position by the pressure applied by the rotatable pressure hub 466 via pressure exerting portion 468. FIGS. 26-27 also illustrate how cut pressure is applied to the housing 440 and ultimately to the cutting blade 462 and the bearer roller 456, as well as applying pressure to retain the pointed end of the detent component 446 into indexed cooperation with a select groove in the cut depth adjusting knob 444.

Cut depth adjusting knob 444 may be rotated up to 90° in either a clockwise or counter-clockwise direction. Rotation of cut depth adjusting knob 444, in turn, causes the eccentric pinion shaft 448 to rotate within housing 440. As best shown in FIGS. 26-27, eccentric pinion shaft 448 directly supports plurality of bearings 458 and plurality of spacers 460, and indirectly supports bearer roller 456 and cutting blade 462, as described more fully below.

Figure 28:
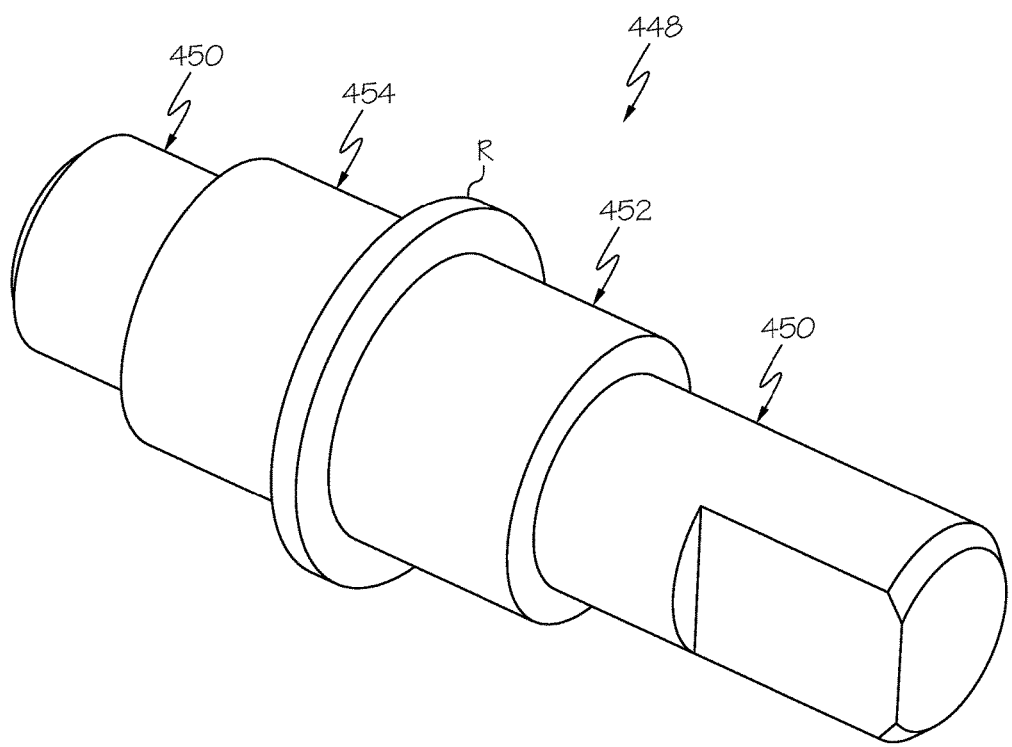
FIG. 28 illustrates a perspective view of the eccentric pinion shaft of the cutter cartridge of the alternative embodiment of the cutter assembly of FIG. 14 in accordance with the disclosed architecture.

FIG. 28 further illustrates eccentric pinion shaft 448, which comprises a pair of housing supports 450 positioned at the ends of eccentric pinion shaft 448, a bearer roller support 452 positioned adjacent to one of said housing supports 450, and a cutter wheel support 454 positioned adjacent to the opposite housing support 450. Further, a spacer or ridge R may be integrally formed in and extend outwardly from and around the circumference of eccentric pinion shaft 448, as shown in FIGS. 26-28, between said bearer roller support 452 and said cutter wheel support 454. Importantly, the pair of housing supports 450 and the bearer roller support 452 are concentrically aligned, but neither the housing supports nor the bearer roller support 452 are concentrically aligned with the cutter wheel support 454. Stated differently, the centerline of cutter wheel support 454 is eccentric or offset from the other sections of the eccentric pinion shaft 448, as explained more fully below.

As discussed supra and best illustrated in FIG. 26, at least one of said plurality of bearings 458 is positioned along eccentric pinion shaft 448 on each side of ridge R and over top of each of bearer roller support 452 and cutter wheel support 454. Further, at least one of said plurality of spacers 460 is also positioned along eccentric pinion shaft 448 adjacent to the outboard side of each of bearings 458, and immediately adjacent to each of said bearer roller support 452 and cutter wheel support 454. Cutter wheel or blade 462 may be any cutter known in the art, but is preferably similar to cutting element 134, as described supra. Cutter wheel 462 is positioned along eccentric pinion shaft 448 over top of bearing 458 which is, in turn, over top of cutter wheel support 454. Similarly, bearer roller 456 is positioned along eccentric pinion shaft 448 over top of bearing 458 which is, in turn, over top of bearer roller support 452. Additionally, bearer roller 456 is typically slightly smaller in diameter than cutting wheel 462, which nominally controls a fixed depth of cut. Additionally, because cutting wheel 462 is rotatably mounted on a bearing 458 that is, in turn, mounted on eccentric section of the pinion shaft 448, when pinion shaft 448 is rotated, cutting wheel 462 will be slightly higher (or lower) than the bearer roller 456, which provides an extended range of cutting depth adjustment to account for other variations in the supply stock thickness, stiffness, or other manufacturing variables.

Figure 29:
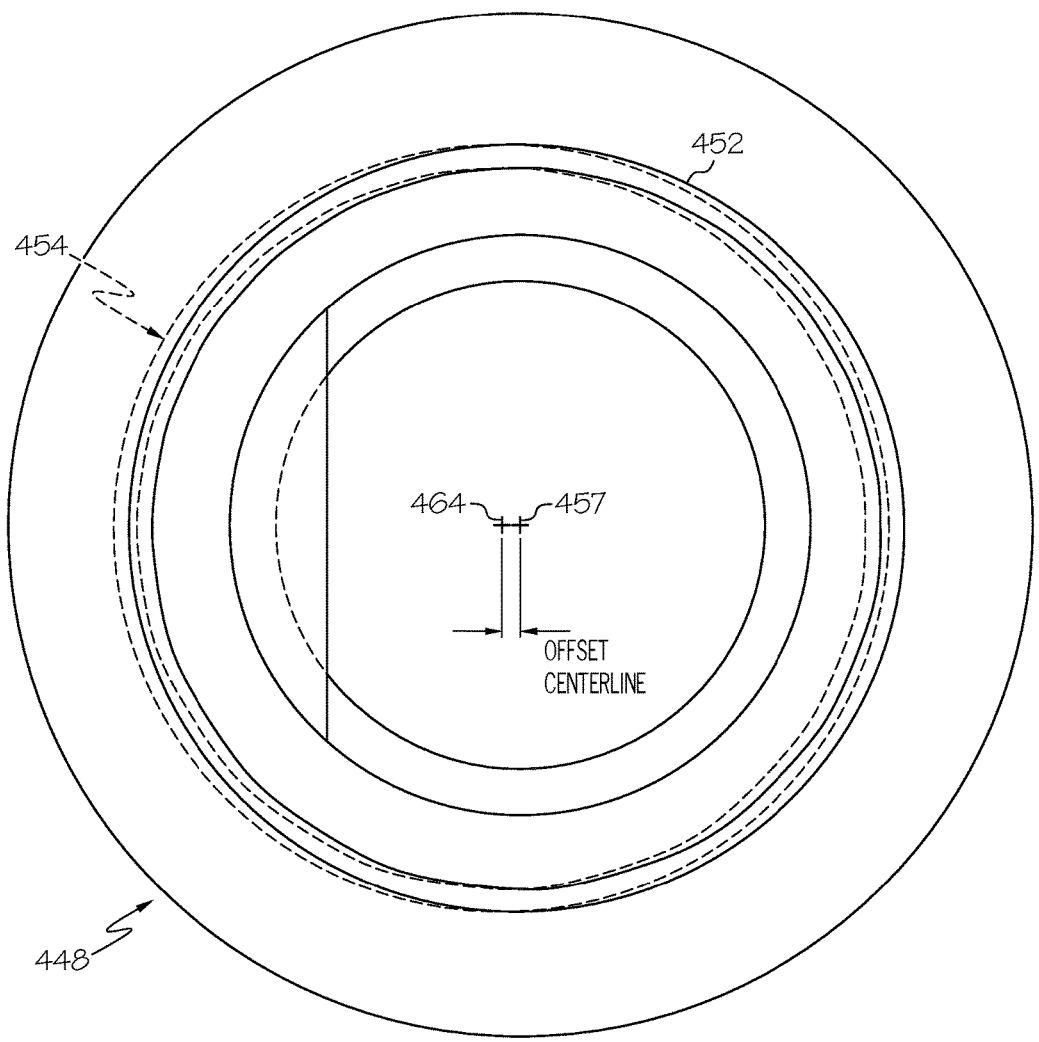
FIG. 29 illustrates a side view of the eccentric pinion shaft of the cutter cartridge of the alternative embodiment of the cutter assembly of FIG. 14 in accordance with the disclosed architecture, as viewed from the bearer roller side.
Figure 30:
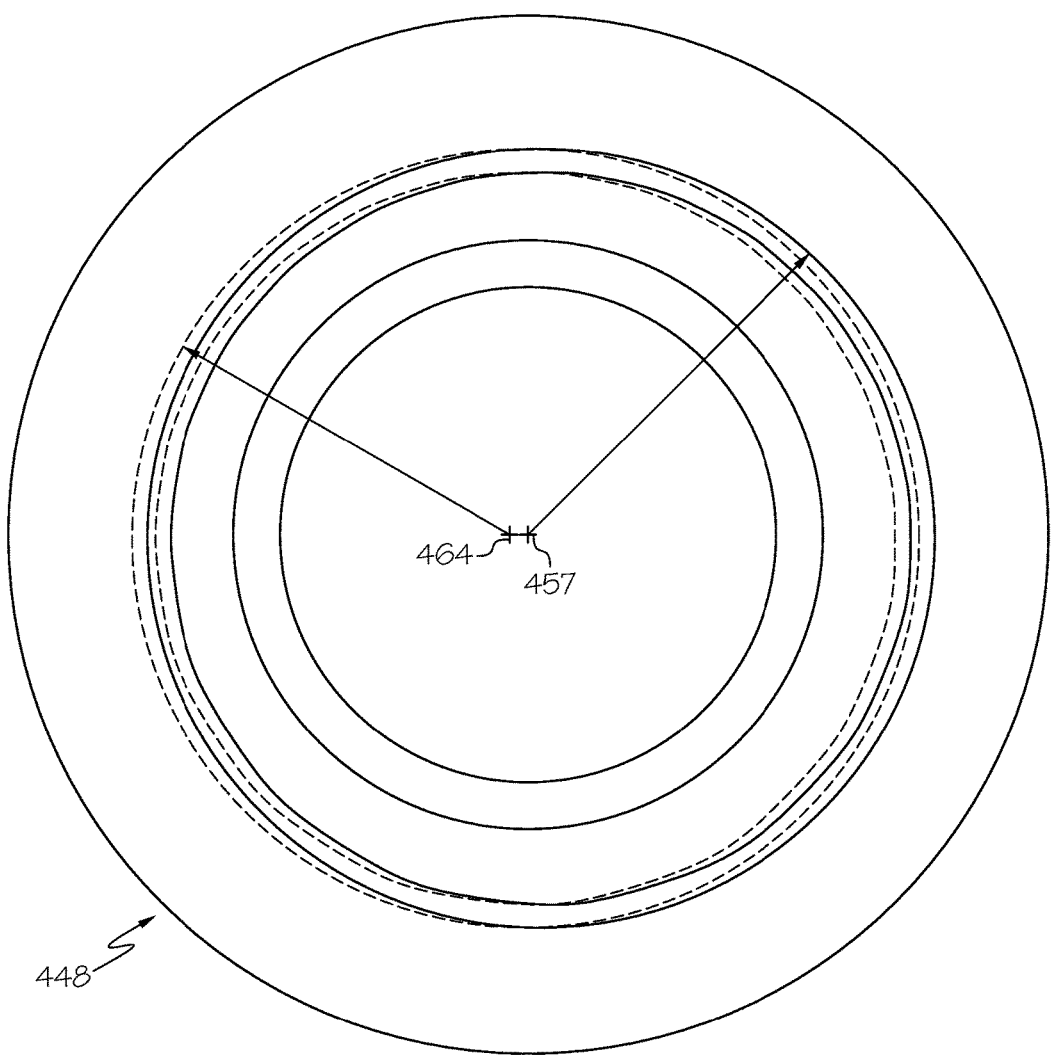
FIG. 30 illustrates a side view of the eccentric pinion shaft of the cutter cartridge of the alternative embodiment of the cutter assembly of FIG. 14 in accordance with the disclosed architecture, as viewed from the cutter wheel side.
Figure 31:
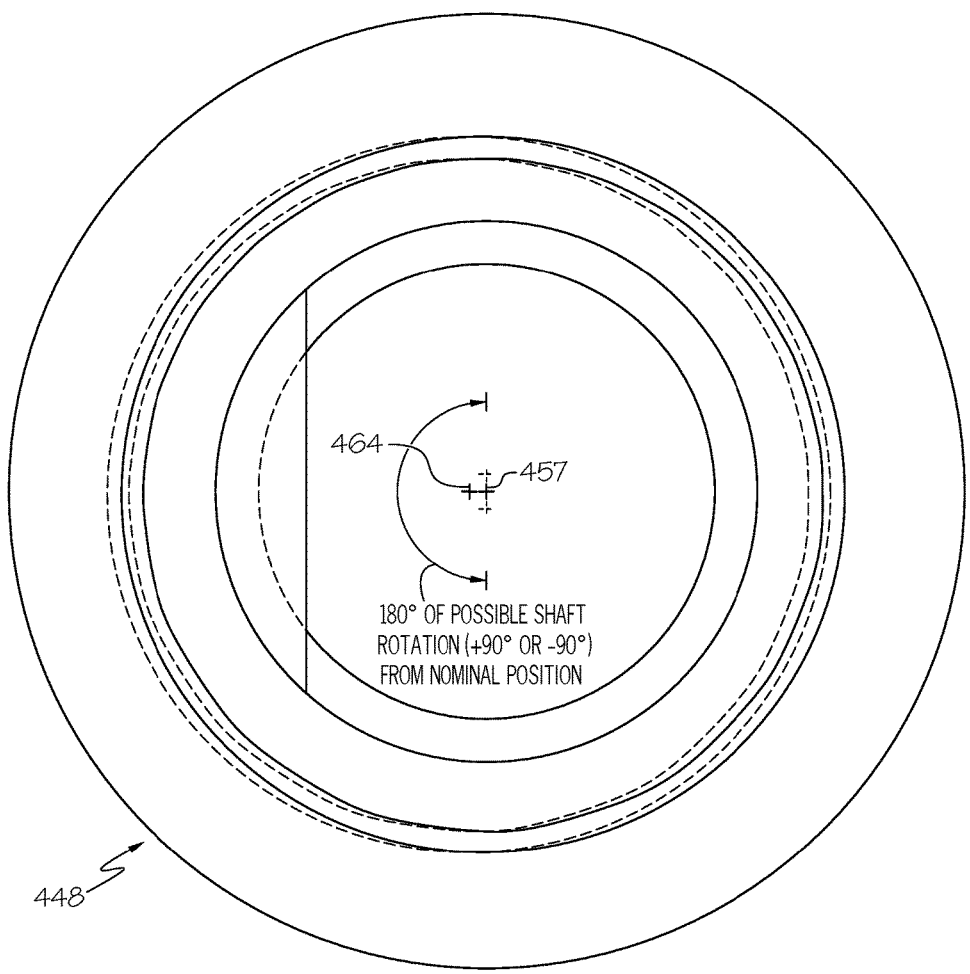
FIG. 31 illustrates an enlarged side view of the eccentric pinion shaft of the cutter cartridge of the alternative embodiment of the cutter assembly of FIG. 14 illustrating higher and lower positions of eccentric portions of the pinion shaft when rotated 90° in either direction, and in accordance with the disclosed architecture.

FIG. 29 illustrates an end view of the eccentric pinion shaft 448 as viewed from the bearer roller support 452 side, and illustrates the offset relationship of a center 457 of the bearer roller 456 and the bearer roller support 452 versus a center 464 of the cutting wheel 462 and the cutter wheel support 454. It should be apparent to one of ordinary skill in the art that as eccentric pinion shaft 448 is rotated up to 90 degrees in either a clockwise or counterclockwise direction (by an operator turning or rotating cut depth adjusting knob 444) about the bearer roller center 457, the center 464 of the cutting blade 462 becomes vertically higher or lower than the center 457 of the bearer roller 452, as also illustrated in FIGS. 30-31. When held in a locked position by the cut depth adjustment knob 444 and the spring loaded detent component 446, this vertically higher or lower positional displacement of the cutting wheel center 464 can further adjust the depth of a cut of the cutting blade 462, which is being controlled by the adjacent bearer roller 456.

FIG. 30 illustrates the same relationship of offset centers 457 and 464 as described supra, but as viewed from the cutting blade 462 side of the eccentric pinion shaft 448. Further, FIG. 31 illustrates an enlarged end view of the offset centers 457 and 464 of the cutter wheel support 454 of the eccentric pinion shaft 448 and the bearer roller support 452 of the eccentric pinion shaft 448. It should be apparent that when rotating the eccentric pinion shaft 448 approximately between +90 degrees or −90 degrees from the nominal position, the center of the cutter wheel support sections 454 becomes higher or lower than the bearer roller support section 452 of the eccentric pinion shaft 448, which will result in slightly deeper or shallower cutting of the supply stock 20.

As opposed to cutter assembly 116 discussed supra in which cut depth is controlled solely by the amount of cutting pressure applied which differs depending on stock thickness, stiffness, density, and blade wear, the cutting force of cutter assembly 424 is constant and not adjustable. Stated differently, the amount of force required to cut into the worst case or hardiest supply stock 20 is designed into the cutter assembly 424, and the nominal cut depth is controlled by the diameter differential of the cutting blade 462 and the bearer roller 456 of a slightly smaller diameter than the cutting blade 462 and runs adjacent to the cutting blade 462. Both the bearer roller 456 and the cutting blade 462 rotate on the eccentric pinion shaft 448, but the cutter wheel support section 454 is on an eccentric or offset center from the bearer roller support 452. This allows for further cut depth adjustment (plus or minus) by manually rotating the cut depth adjuster which, in turn, rotates the eccentric pinion shaft 448 such that the offset center of the cutting blade 462 becomes higher or lower than the controlling bearer roller 456. The rotatable pinion shaft 448 is indexed and retained in adjusted positions by an externally knurled or grooved knob (not shown) which is pressed into an end of the pinion shaft 448 and cooperates with the detent component 446 that is slidably retained within the cutter cartridge housing 440 and held in position by the same pressure hub 466 that applies the cutting pressure to the entire cutter assembly 424.

In summary, the cutter assembly 424 offers many distinct advantages including, without limitation, the following: (i) the cutter mechanism and attaching covers may be configured to have a wide angled exit throat to facilitate the delamination and removal of newly cut labels or other materials from the liner carrier web; (ii) the cutter wheel and depth controlling components are housed within a cartridge assembly that is easily installed and removed without the use of external tools, thereby decreasing downtime for the device and resulting in cost savings for the user; (iii) the cutter wheel and depth controlling components may be retained in position by the same component that apply the cutting pressure; (iv) cutting pressure may be attained by use of a single extension spring which rotates a pressure hub component about the worm screw shaft to result in direct line force downward onto the cutter cartridge; and (v) additional cut depth may be controlled by rotating the common eccentric shaft that supports the cutter wheel and the bearer roller.

Figure 32:
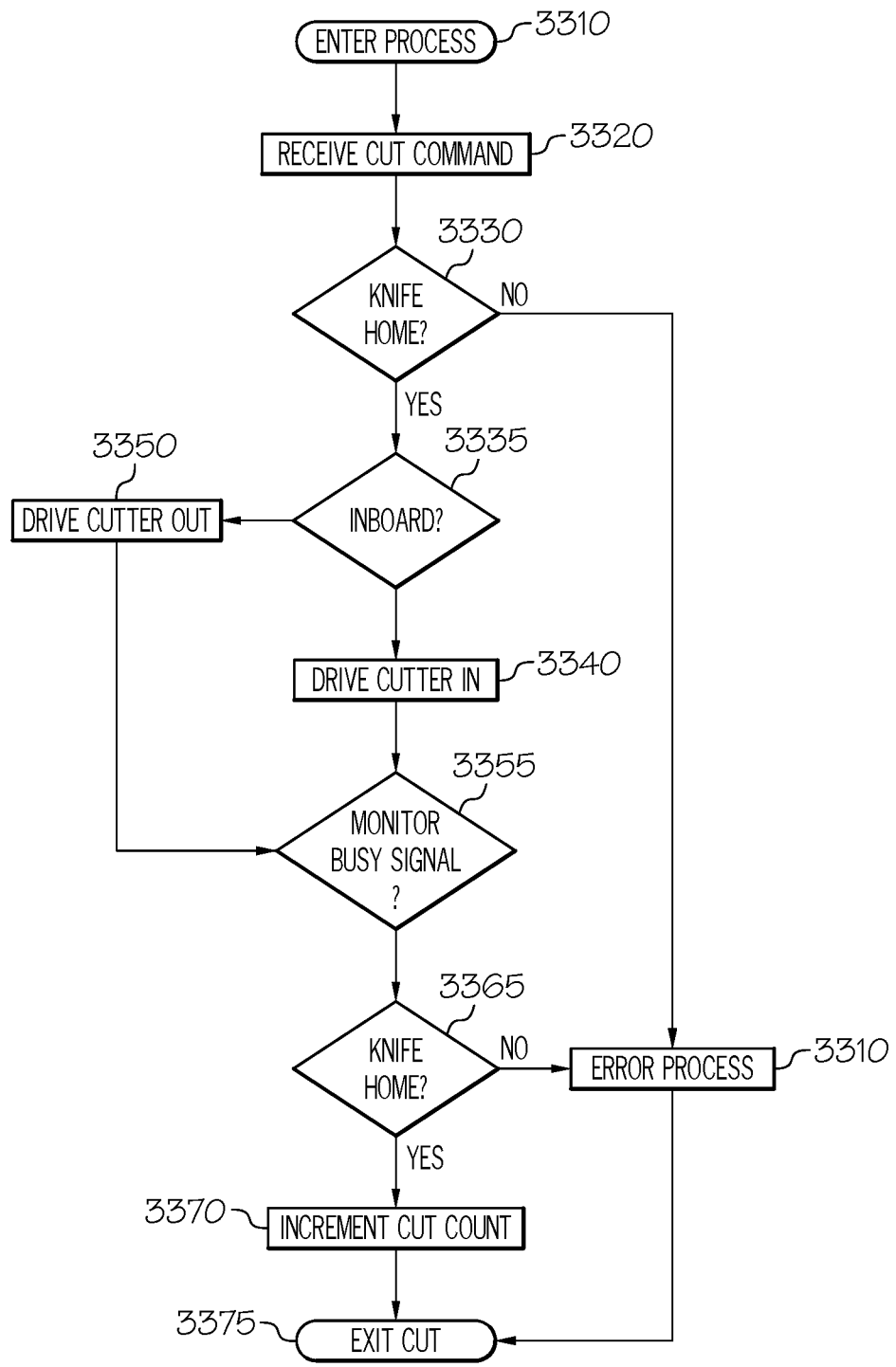
FIG. 32 illustrates a sample cut process flow chart, as controlled by a microprocessor, in accordance with the disclosed architecture.

FIG. 32 illustrates a sample cut process flow chart, as controlled by a microprocessor. More specifically, the process of cutting supply stock 20 using cutting apparatus 100 begins at 3310 when a cut command is received by a controller board at 3320. At 3330, the process determines if the knife or cutter is in the home position using sensors. The sensors may be mounted on the adjustable guide to control the cut width or, alternatively, the cut width can be controlled by the microprocessor. If the cutter is not in the home position, an error is detected at 3360 and the cut process terminates at 3375.

If, on the other hand, it is determined that the cutter is in the home position at 3335, then the cutter may be driven inward at 3340 or outward at 3350 and, during the entire process, a busy signal is monitored 3355 by the microprocessor until the cutter is returned to the home position at 3365. If the cutter does not return to the home position as expected or the busy signal is removed before the home sensor is engaged, an error is detected at 3360 and the cut process terminates at 3375. If, on the other hand, the cutter is returned home at 3365 and the motor signal is low, the process was successfully completed and, at 3370, a cut count is incremented and the process exits at 3375.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A combination printing and cutting device comprising:
   a printer;
   a carriage assembly; and
   a cutter assembly movably attached to the carriage assembly, the cutter assembly comprising:
      an eccentric pinion shaft, comprising:
         a housing support;
         a bearer roller support; and
         a cutter wheel support.

2. The combination printing and cutting device of claim 1, wherein the carriage assembly comprises a screw shaft for moving the cutter assembly.

3. The combination printing and cutting device of claim 2, wherein the screw shaft is a worm screw.

4. The combination printing and cutting device of claim 1, wherein the cutter assembly comprises a cutting element.

5. The combination printing and cutting device of claim 4, wherein the cutting element is a wheel knife.

6. The combination printing and cutting device of claim 1, wherein the cutter assembly cuts in two directions.

7. The combination printing and cutting device of claim 1, wherein the carriage assembly comprises a guide shaft for directing the cutter assembly.

8. A combination printing and cutting device comprising:
   a printer;
   a carriage assembly;
   a cutter assembly movably attached to the carriage assembly;
   an eccentric pinion shaft, comprising a housing support, a bearer roller support and a cutter wheel support; and
   a pressure adjusting element.

9. The combination printing and cutting device of claim 8, wherein the cutter assembly comprises a cutting element.

10. The combination printing and cutting device of claim 9, wherein the cutting element is capable of making angled cuts on a stock material.

11. The combination printing and cutting device of claim 8, wherein the carriage assembly retains the cutter assembly.

12. The combination printing and cutting device of claim 8, wherein the device further comprises a drive element for moving the cutter assembly along the carriage assembly.

13. The combination printing and cutting device of claim 8, wherein the carriage assembly comprises an anvil.

14. A combination printing and cutting device comprising:
   a printer;
   a carriage assembly;
   a cutter assembly comprised of a cutter carrier and a cutter cartridge;
   an eccentric pinion shaft, comprising a housing support, a bearer roller support and a cutter wheel support; and
   a drive element.

15. The combination printing and cutting device of claim 14 further comprising a cartridge release actuator, a pressure adjusting element and a pressure hub.

16. The combination printing and cutting device of claim 15, wherein said pressure adjusting element controls the amount of pressure applied by said cutter cartridge to a stock material.

17. The combination printing and cutting device of claim 14, wherein the cutter cartridge comprises a cut depth adjuster and a cutting blade.

18. The combination printing and cutting device of claim 17, wherein the cutter cartridge further comprises a detent component and a bearer roller.

19. A cutter assembly comprising:
   a cutting element;
   a guide element;
   a holder;
   an eccentric pinion shaft, comprising a housing support, a bearer roller support and a cutter wheel support; and
   a pressure adjusting element.

* * * * *